US011870176B2

(12) United States Patent
Soudy et al.

(10) Patent No.: US 11,870,176 B2
(45) Date of Patent: Jan. 9, 2024

(54) HIGH DENSITY ELECTRICAL CONNECTORS

(71) Applicant: FCI USA LLC, Etters, PA (US)

(72) Inventors: Aymeric Soudy, Franois (FR); Cyril Jeune, Lantenne-Vertiere (FR); Arnaud Hyppias, Fraisans (FR)

(73) Assignee: FCI USA LLC, Etters, PA (US)

( * ) Notice: Subject to any disclaimer, the term of this patent is extended or adjusted under 35 U.S.C. 154(b) by 0 days.

(21) Appl. No.: 17/576,819

(22) Filed: Jan. 14, 2022

(65) Prior Publication Data

US 2022/0216638 A1 Jul. 7, 2022

Related U.S. Application Data

(63) Continuation of application No. 16/355,286, filed on Mar. 15, 2019, now Pat. No. 11,228,130.

(30) Foreign Application Priority Data

Mar. 16, 2018 (FR) ...................................... 1852288

(51) Int. Cl.
*H01R 13/436* (2006.01)
*H01R 13/627* (2006.01)
(Continued)

(52) U.S. Cl.
CPC ......... *H01R 13/4367* (2013.01); *H01R 4/185* (2013.01); *H01R 13/428* (2013.01);
(Continued)

(58) Field of Classification Search
CPC ............ H01R 13/6272; H01R 13/4365; H01R 13/641; H01R 13/639; H01R 13/4367;
(Continued)

(56) References Cited

U.S. PATENT DOCUMENTS 3,268,851 A 8/1966 Mancini
3,663,931 A 5/1972 Brown
(Continued)

FOREIGN PATENT DOCUMENTS

CN 1149212 A 5/1997
CN 1152807 A 6/1997
(Continued)

OTHER PUBLICATIONS

Japanese Office Action dated Feb. 27, 2023 in connection with Japanese Application No. 2020-573086.
(Continued)

*Primary Examiner* — Briggitte R. Hammond
(74) *Attorney, Agent, or Firm* — Wolf, Greenfield & Sacks, P.C.

(57) ABSTRACT

In various embodiments, compact connector designs may be provided that have reduced board pitch (e.g., 1.80 mm, 1.50 mm, 1.27 mm, etc.), but are still capable of accommodating large electrical conductors (e.g., 1.4 mm, 1.1 mm, 0.9 mm, etc.). In this manner, PCB footprint may be reduced (e.g., by 50% when a staggered connector configuration is used), while adequate current carrying capacity may be maintained (e.g., 2 A, 3 A, 4 A, etc.). Additionally, or alternatively, one or more other advantages may be achieved, such as ruggedness (e.g., vibration endurance), error proofing, configuration flexibility, ease of manufacturing, ease of assembly, and/or lowered costs.

21 Claims, 18 Drawing Sheets

(51) Int. Cl.
*H01R 13/428* (2006.01)
*H01R 4/18* (2006.01)

(52) U.S. Cl.
CPC ..... *H01R 13/4362* (2013.01); *H01R 13/6272* (2013.01); *H01R 13/6275* (2013.01)

(58) Field of Classification Search
CPC .. H01R 4/185; H01R 13/428; H01R 13/4362; H01R 13/6275
See application file for complete search history.

(56) References Cited

U.S. PATENT DOCUMENTS 3,665,378 A 5/1972 Hammell et al.
3,781,770 A 12/1973 Mancini
3,823,392 A 7/1974 Pfeifer
3,836,947 A 9/1974 Yeager
4,317,609 A 3/1982 Lapraik
4,379,611 A 4/1983 Foege et al.
4,480,386 A 11/1984 Adams
4,720,272 A 1/1988 Durand
4,722,704 A 2/1988 VanDerStuyf et al.
4,898,548 A 2/1990 Case et al.
4,900,271 A 2/1990 Colleran et al.
4,950,183 A 8/1990 Watanabe et al.
4,984,998 A 1/1991 Duncan et al.
5,199,900 A 4/1993 Hayes, Sr.
5,236,373 A * 8/1993 Kennedy .............. H01R 13/639 439/352
5,252,097 A 10/1993 Lindeberg et al.
5,259,796 A 11/1993 Yamada et al.
5,281,175 A 1/1994 Chupak et al.
5,299,958 A 4/1994 Ohsumi
5,344,194 A 9/1994 Hatagishi et al.
5,382,177 A 1/1995 Hutchinson, Jr. et al.
5,575,671 A 11/1996 Katsuma
5,593,328 A 1/1997 Okada et al.
5,595,509 A 1/1997 Fry et al.
5,651,700 A 7/1997 Sato et al.
5,658,174 A 8/1997 Benes et al.
5,681,190 A 10/1997 Childs
5,690,517 A 11/1997 Betsui
5,735,717 A 4/1998 Nabeshima
5,762,524 A 6/1998 Ford et al.
5,810,626 A 9/1998 Heimueller et al.
5,865,636 A 2/1999 Myer et al.
5,897,405 A 4/1999 Endo
5,938,485 A 8/1999 Hotea et al.
5,951,339 A 9/1999 Chaillot et al.
5,971,815 A 10/1999 Polgar et al.
6,039,615 A 3/2000 Suzuki
6,174,208 B1 1/2001 Chen
6,186,810 B1 2/2001 Barnabe et al.
6,193,551 B1 2/2001 Yamamoto et al.
6,244,910 B1 6/2001 Grubbs
6,299,489 B1 10/2001 Phillips et al.
6,305,992 B1 10/2001 Bouda et al.
6,315,591 B2 11/2001 Oda et al.
6,338,638 B2 1/2002 Kodama
6,379,199 B1 4/2002 Chen
6,402,571 B1 6/2002 Muller et al.
6,439,935 B2 8/2002 Saka et al.
6,447,345 B2 9/2002 Sato et al.
6,475,040 B1 11/2002 Myer et al.
6,524,135 B1 2/2003 Feldman et al.
6,547,608 B2 4/2003 Sato et al.
6,558,176 B1 5/2003 Martin et al.
6,585,544 B2 7/2003 Furutani
6,648,699 B1 11/2003 Makino et al.
6,669,507 B2 12/2003 Yamanashi et al.
6,679,736 B2 1/2004 Saka
6,736,684 B2 5/2004 Ishiyama
6,755,697 B2 6/2004 Kojima et al.
6,971,927 B2 12/2005 Anbo et al.
7,048,582 B2 5/2006 Tabata et al.
7,144,281 B2 12/2006 Maeda
7,156,704 B2 1/2007 Shimizu
7,175,483 B2 2/2007 Ishikawa
7,179,138 B2 2/2007 Nora et al.
7,252,564 B1 8/2007 Morello et al.
7,278,883 B2 10/2007 Tyler
7,294,027 B1 11/2007 Tyler
7,300,319 B2 11/2007 Lutsch et al.
7,303,027 B1 12/2007 Laemmer
7,351,122 B2 4/2008 Suemitsu et al.
7,442,058 B2 10/2008 Ohtaka et al.
7,556,539 B2 7/2009 Takahashi et al.
7,938,695 B2 5/2011 Furutani et al.
7,950,972 B1 5/2011 Chen et al.
7,976,351 B2 7/2011 Boemmel et al.
8,043,130 B2 10/2011 Casses et al.
8,241,076 B2 8/2012 Kubota
8,241,077 B2 8/2012 Suzuki et al.
8,747,156 B2 6/2014 Hirabayashi
8,974,256 B2 3/2015 Okano et al.
9,011,186 B2 4/2015 Wirth et al.
9,039,467 B2 5/2015 Seipel et al.
9,054,431 B2 6/2015 Endo
9,130,282 B2 9/2015 Suzuki et al.
9,136,641 B2 9/2015 Bishop
9,166,325 B2 10/2015 Bishop
9,407,026 B2 8/2016 Campbell et al.
9,446,893 B2 9/2016 Haimi
9,466,893 B2 10/2016 Bishop
9,570,854 B2 2/2017 Hashimoto
9,601,854 B2 3/2017 Kutsuna et al.
9,972,932 B2 5/2018 Copper et al.
9,979,131 B2 * 5/2018 Venkatesan ........ H01R 13/6272
10,230,178 B2 3/2019 Droesbeke et al.
10,230,189 B2 3/2019 Droesbeke et al.
10,879,639 B2 12/2020 Droesbeke et al.
11,228,130 B2 1/2022 Soudy et al.
2001/0051472 A1 12/2001 Sato et al.
2002/0076999 A1 6/2002 Chen
2002/0086575 A1 7/2002 Marpoe et al.
2002/0160666 A1 10/2002 Sato et al.
2003/0054681 A1 3/2003 Hatagishi et al.
2003/0057958 A1 3/2003 Fukushima et al.
2003/0096533 A1 5/2003 Kojima et al.
2003/0199185 A1 10/2003 Fujii et al.
2003/0220015 A1 11/2003 Ishiyama
2004/0142605 A1 7/2004 Harada et al.
2005/0153605 A1 7/2005 Anbo et al.
2005/0164568 A1 7/2005 Amara et al.
2005/0227551 A1 10/2005 Tabata et al.
2005/0287877 A1 12/2005 Fukuda et al.
2006/0035538 A1 2/2006 Suemitsu et al.
2006/0073741 A1 4/2006 Bommersheim
2006/0094305 A1 5/2006 Masaki et al.
2006/0234535 A1 10/2006 Ohtaka et al.
2008/0070452 A1 3/2008 Komiyama et al.
2008/0280510 A1 11/2008 Moll et al.
2010/0015863 A1 1/2010 Sugiyama et al.
2010/0197177 A1 8/2010 Myer et al.
2010/0197178 A1 8/2010 Hotea et al.
2011/0053405 A1 3/2011 Kobayashi et al.
2011/0086557 A1 4/2011 Kubota
2011/0117761 A1 5/2011 Loncar et al.
2011/0151694 A1 6/2011 Horiuchi et al.
2011/0212656 A1 9/2011 Suzuki et al.
2012/0034827 A1 2/2012 Ishikawa et al.
2012/0142233 A1 6/2012 Blasko et al.
2012/0214360 A1 8/2012 Kumakura et al.
2012/0264340 A1 10/2012 Mueller
2012/0295493 A1 11/2012 Hirabayashi
2012/0329341 A1 12/2012 Morikawa et al.
2013/0017697 A1 1/2013 Furuya et al.
2013/0102180 A1 4/2013 Muro
2013/0143454 A1 6/2013 Onuma et al.
2013/0183865 A1 7/2013 Lappoehn
2013/0288546 A1 10/2013 Okano et al.
2013/0288547 A1 10/2013 Amano et al.
2014/0287621 A1 9/2014 Smutny et al.
2015/0050838 A1 2/2015 Copper et al.

(56) References Cited

U.S. PATENT DOCUMENTS

| | | | |
|---|---|---|---|
| 2015/0222038 | A1 | 8/2015 | Volpone et al. |
| 2015/0263453 | A1 | 9/2015 | Wang et al. |
| 2015/0303593 | A1 | 10/2015 | Ono |
| 2016/0013575 | A1 | 1/2016 | Campbell et al. |
| 2016/0104948 | A1 | 4/2016 | Droesbeke et al. |
| 2016/0118745 | A1 | 4/2016 | Droesbeke et al. |
| 2016/0359251 | A1 | 12/2016 | Droesbeke et al. |
| 2019/0288436 | A1 | 9/2019 | Soudy et al. |
| 2019/0312372 | A1 | 10/2019 | Droesbeke et al. |

FOREIGN PATENT DOCUMENTS

| | | | |
|---|---|---|---|
| CN | 1229287 | A | 9/1999 |
| CN | 1328361 | A | 12/2001 |
| CN | 201417851 | Y | 3/2010 |
| CN | 101728687 | A | 6/2010 |
| CN | 102119470 | A | 7/2011 |
| CN | 102195182 | A | 9/2011 |
| CN | 202651500 | U | 1/2013 |
| CN | 102971918 | A | 3/2013 |
| CN | 103109418 | A | 5/2013 |
| CN | 106233533 | A | 12/2016 |
| CN | 106816737 | A | 6/2017 |
| DE | 2808671 | A1 | 9/1979 |
| DE | 10 2004 052 378 | A1 | 5/2006 |
| DE | 10 2006 062704 | A1 | 2/2008 |
| DE | 202013001074 | U1 | 2/2013 |
| EP | 0600469 | A1 | 6/1994 |
| EP | 0676827 | A2 | 10/1995 |
| EP | 0 713 263 | B1 | 9/2000 |
| EP | 1912290 | A1 | 4/2008 |
| JP | H04-109574 | A | 4/1992 |
| JP | H05-015370 | U | 2/1993 |
| JP | H05-144499 | A | 6/1993 |
| JP | H05-073872 | U | 10/1993 |
| JP | H06-058570 | U | 8/1994 |
| JP | H07-073923 | A | 3/1995 |
| JP | H07-263066 | A | 10/1995 |
| JP | H07-288147 | A | 10/1995 |
| JP | H08-106944 | A | 4/1996 |
| JP | H10-284160 | A | 10/1998 |
| JP | H11-40233 | A | 2/1999 |
| JP | H11-329585 | A | 11/1999 |
| JP | 2000-067975 | A1 | 3/2000 |
| JP | 2000-173703 | A | 6/2000 |
| JP | 2001-135398 | A | 5/2001 |
| JP | 2002-008763 | A | 1/2002 |
| JP | 2002-093508 | A | 3/2002 |
| JP | 2003-022872 | A | 1/2003 |
| JP | 2003-068397 | A | 3/2003 |
| JP | 2003-086284 | A | 3/2003 |
| JP | 3390331 | B2 | 3/2003 |
| JP | 2003-208948 | A | 7/2003 |
| JP | 2005-302581 | A | 10/2005 |
| JP | 2009-283308 | A | 12/2009 |
| JP | 2014-222648 | A | 11/2014 |
| JP | 2015-056272 | A | 3/2015 |
| JP | 2017-152274 | A | 8/2017 |
| TW | 201709619 | A | 3/2017 |
| WO | WO 2010/015894 | A1 | 2/2010 |
| WO | WO 2011/067632 | A1 | 6/2011 |
| WO | WO 2011/087863 | A2 | 7/2011 |
| WO | WO 2013/046663 | A1 | 4/2013 |

OTHER PUBLICATIONS

Taiwanese Office Action dated Feb. 14, 2023 in connection with Taiwanese Application No. 108108974.

Chinese Office Action dated Feb. 15, 2022 in connection with Chinese Application No. 201980025001.2.

Chinese Office Action dated Jun. 25, 2021 in connection with Chinese Application No. 201980025001.2.

European Office Action for European Application No. 13742267.1 dated Oct. 20, 2016.

Extended European Search Report dated Nov. 10, 2021 for Application No. EP 19766814.8.

Extended European Search Report dated Nov. 10, 2021 for European Application No. 19766814.8.

Extended European Search Report dated Sep. 23, 2019 for Application No. EP 19162108.5.

Extended European Search Report dated Feb. 21, 2017 for Application No. EP 14838530.5.

International Preliminary Report on Patentability for Application No. PCT/US2019/022548, dated Oct. 1, 2020.

International Preliminary Report on Patentability for International Application No. PCT/EP2013/075350 dated Jun. 16, 2016.

International Preliminary Report on Patentability dated Dec. 17, 2015 for Application No. PCT/IB2013/001340.

International Preliminary Report on Patentability dated Mar. 3, 2016 for Application No. PCT/US2014/051203.

International Search Report and Written Opinion for International Application No. PCT/EP2013/075350 dated Jul. 18, 2014.

International Search Report and Written Opinion for International Application No. PCT/IB2013/001335 dated Feb. 18, 2014.

International Search Report and Written Opinion for International Application No. PCT/US2019/022548 dated Jul. 3, 2019.

International Search Report and Written Opinion dated Feb. 3, 2014 for Application No. PCT/IB2013/001340.

International Search Report and Written Opinion dated Nov. 21, 2014 for Application No. PCT/US2014/051203.

Chinese Office Action dated Oct. 10, 2022 in connection with Chinese Application No. 201980025001.2.

CN 201980025001.2, Jun. 25, 2021, Chinese Office Action.

CN 201980025001.2, Feb. 15, 2022, Chinese Office Action.

EP 13742267.1, Oct. 20, 2016, Office Action.

EP 14838530.5, Feb. 21, 2017, Extended European Search Report.

EP 19162108.5, Sep. 23, 2019, Extended European Search Report.

EP 19766814.8, Nov. 10, 2021, Extended European Search Report.

PCT/EP2013/075350, Jul. 18, 2014, International Search Report and Written Opinion.

PCT/EP2013/075350, Jun. 16, 2016, International Preliminary Report on Patentability.

PCT/IB2013/001335, Feb. 18, 2014, International Search Report and Written Opinion.

PCT/IB2013/001340, Feb. 3, 2014, International Search Report and Written Opinion.

PCT/IB2013/001340, Dec. 17, 2015, International Preliminary Report on Patentability.

PCT/US2014/051203, Nov. 21, 2014, International Search Report and Written Opinion.

PCT/US2014/051203, Mar. 3, 2016, International Preliminary Report on Patentability.

PCT/US2019/022548, Jul. 3, 2019, International Search Report and Written Opinion.

PCT/US2019/022548, Oct. 1, 2020, International Preliminary Report on Patentability.

* cited by examiner

HIGH DENSITY ELECTRICAL CONNECTORS

CROSS-REFERENCE TO RELATED APPLICATIONS

This application is a Continuation of U.S. application Ser. No. 16/355,286, filed Mar. 15, 2019, entitled "HIGH DENSITY ELECTRICAL CONNECTORS" which claims priority to and the benefit of French Application Serial No. 1852288, filed Mar. 16, 2018, entitled "HIGH DENSITY ELECTRICAL CONNECTORS." The entire contents of these applications are incorporated herein by reference in their entirety.

BACKGROUND

Many electrical devices are controlled by, and/or powered via, printed circuit boards (PCBs). For instance, in an automobile, an electrical connector may be used to connect an LED lamp to a PCB controlling and/or powering the LED lamp. Such a connector may include an electrical terminal configured to be crimped onto an electrically conductive wire (e.g., a wire of a cable connected to the LED lamp) and/or a contact pin configured to be soldered onto the PCB.

There is a continuing trend in many fields to miniaturize components. This creates an ongoing need for electrical connectors with high signal density. Furthermore, there is a need for improved vibration endurance. For instance, in an automotive application, it may be desirable to prevent two mated connectors from becoming unmated due to vibration in an operating environment.

U.S. Patent Application Publication No. 2015/0050838 (hereafter "the '838 publication") shows, among other things, examples of terminals for use in a connector. Such a terminal may be securely crimped onto a wire of an electrical cable. The '838 publication also shows a connector having a core and a housing, where the core and the housing are attached to each other with a retention force that is higher than a retention force provided between the connector and a mating connector, so as to prevent the core and the housing from accidentally being pulled apart when a user attempts to unmate the two connectors.

SUMMARY

In some embodiments, a terminal provided for use in a first electrical connector, the terminal comprising: a mating end configured to receive a contact pin of a second electrical connector; a crimping end configured to be crimped onto an electrical wire; and an intermediate portion between the mating end and the crimping end, wherein: the terminal is elongated along a mating direction; and the intermediate portion comprises a locking feature that is biased outwardly from a center line of the terminal along the mating direction.

In some embodiments, an electrical connector is provided, comprising: a housing; a terminal position assurance (TPA) feature attached to the housing, the TPA feature being movable between a disengaged configuration and an engaged configuration; and a terminal inserted into a cavity in the housing, wherein: when the TPA feature is in the engaged configuration, a locking feature of the terminal engages the TPA feature to retain the terminal in the cavity.

In some embodiments, an electrical connector is provided, comprising: a housing; a terminal position assurance (TPA) feature attached to the housing, the TPA feature being movable between a disengaged configuration and an engaged configuration; and a terminal inserted into a cavity in the housing, wherein: the TPA feature comprises a protrusion; when the TPA feature is in the disengaged configuration, the protrusion of the TPA feature is aligned with a wall of the cavity to allow insertion of the terminal into the cavity; and the protrusion of the TPA feature has a ramped profile configured to guide the terminal as the terminal is being inserted into the housing when the TPA feature is in the disengaged configuration.

In some embodiments, a first electrical connector is provided, comprising: a first housing; and a terminal position assurance (TPA) feature attached to the first housing, the TPA feature being movable between a disengaged configuration and an engaged configuration, wherein: the first electrical connector is configured to mate with a second electrical connector having a second housing; and the TPA feature comprises a latch configured to engage the second housing to secure the first and second electrical connectors together in a mated configuration.

In some embodiments, an electrical connector is provided, comprising: a housing; and a hold-down having first, second, and third attachment features, wherein: the first attachment feature impedes lateral movement between the hold-down and the housing; the second attachment feature impedes vertical movement between the hold-down and the housing; and the third attachment feature is configured to be attached to a printed circuit board (PCB), to secure the electrical connector to the PCB.

In some embodiments, a first electrical connector is provided, comprising: a first housing; and a connector position assurance (CPA) feature attached to the first housing, the CPA feature being movable between a disengaged configuration and an engaged configuration, wherein: the CPA feature comprises a first latch configured to attach the CPA feature to the first housing when the CPA feature is in the disengaged configuration; the first electrical connector is configured to mate with a second electrical connector having a second housing; the CPA feature comprises a second latch configured to attach the CPA feature to the second housing when the CPA feature is in the engaged configuration; and the first housing is configured to impede the CPA feature from moving into the engaged configuration when the first and second electrical connectors are not fully mated.

DETAILED DESCRIPTION

In various embodiments, compact connector designs may be provided that have reduced board pitch (e.g., 1.80 mm, 1.50 mm, 1.27 mm, etc.), but are still capable of accommodating large electrical conductors (e.g., 1.4 mm, 1.1 mm, 0.9 mm, etc.). In this manner, PCB footprint may be reduced (e.g., by 50% when a staggered connector configuration is used), while adequate current carrying capacity may be maintained (e.g., 2 A, 3 A, 4 A, etc.). Additionally, or alternatively, one or more other advantages may be achieved, such as ruggedness (e.g., vibration endurance), error proofing, configuration flexibility, ease of manufacturing, ease of assembly, and/or lowered costs.

Figure 1A:
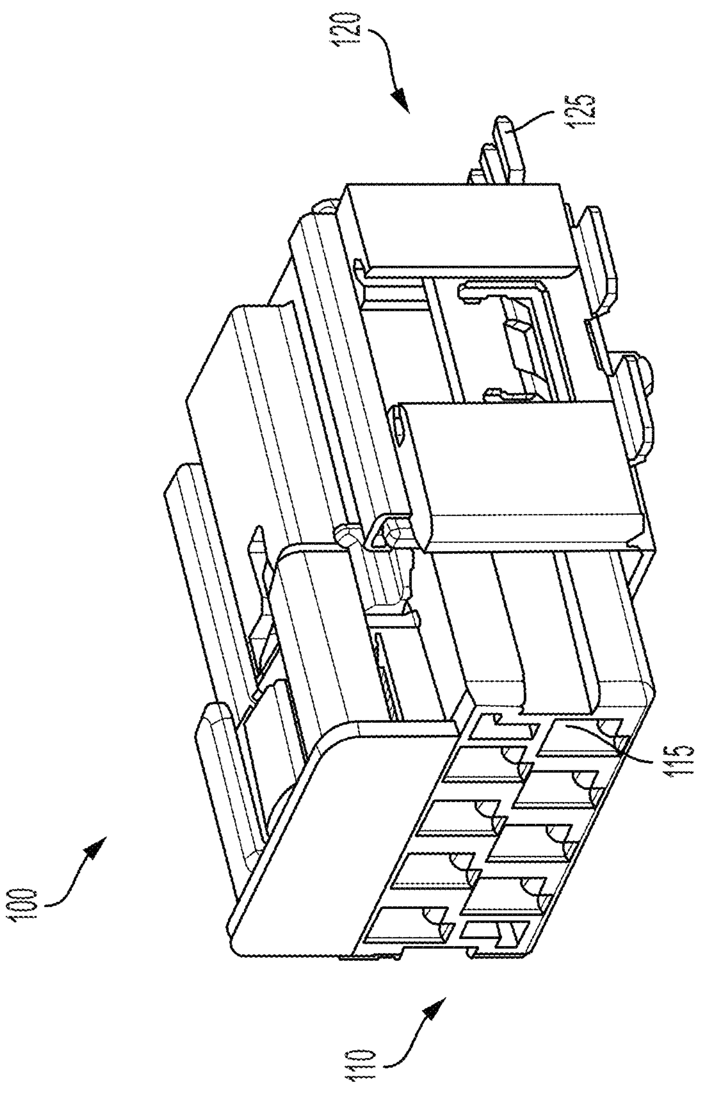
FIG. 1A shows an illustrative connector 100, in accordance with some embodiments.

FIG. 1A shows an illustrative connector 100, in accordance with some embodiments. In this example, the connector 100 includes a cable interface 110 and a board interface 120. The cable interface 110 may be configured receive one or more wires of an electrical cable. For instance, the cable interface 105 may include an opening 115 into which an electrical terminal may be inserted, where the terminal may be crimped onto a wire of an electrical cable. The board interface 120 may be configured to make electrical connections with one or more traces of a PCB. For instance, the board interface 120 may include a contact pin 125 configured to be soldered onto a PCB using any suitable technique such as surface mount device (SMD), pin-in-paste (PiP), etc.

Figure 1B:
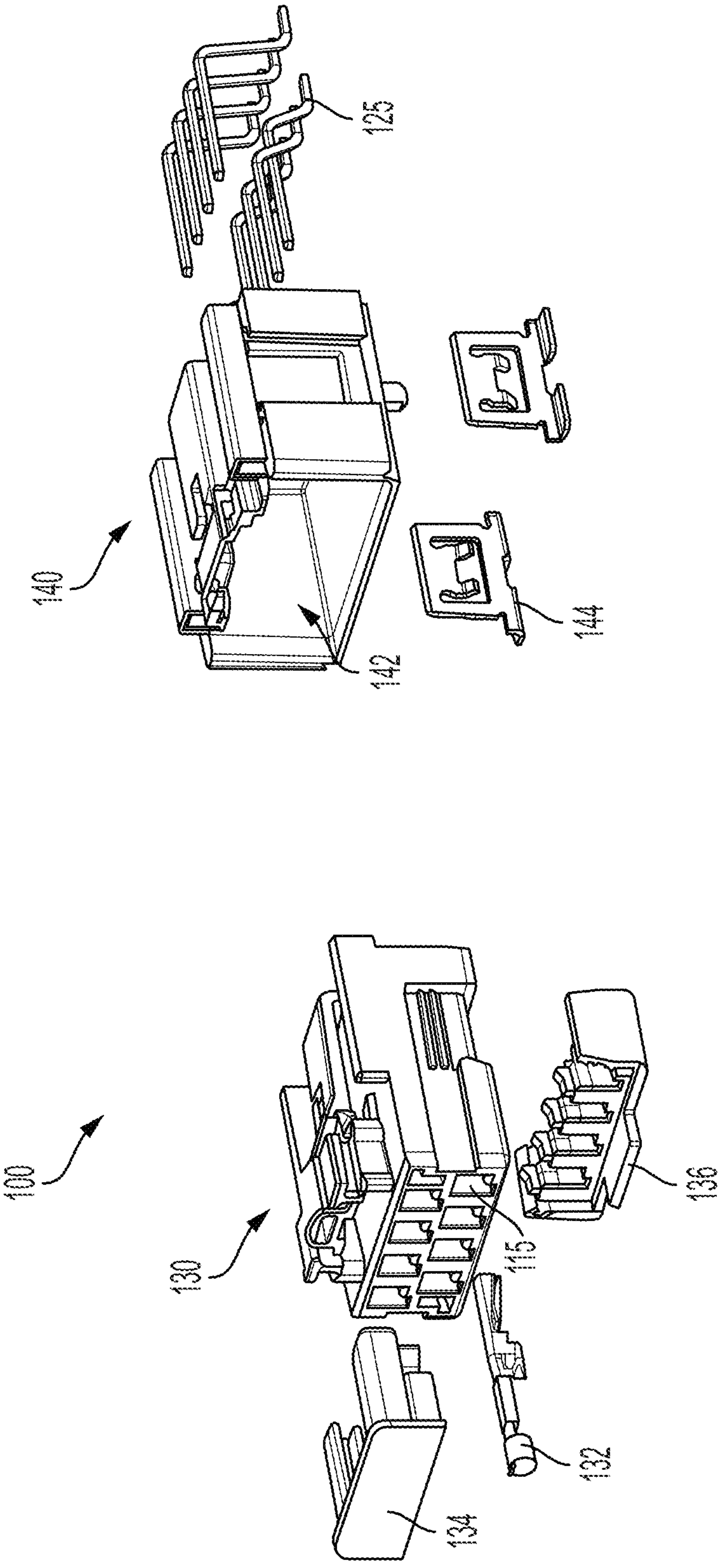
FIG. 1B is an exploded view of the illustrative connector 100 shown in FIG. 1A, in accordance with some embodiments.

FIG. 1B is an exploded view of the illustrative connector 100 shown in FIG. 1A, in accordance with some embodiments. In this example, the connector 100 includes a receptacle 130 and a header 140. The illustrative cable interface 110 and the illustrative board interface 120 shown in FIG. 1A may be located, respectively, at the receptacle 130 and the header 140.

In some embodiments, the receptacle 130 and the header 140 may be configured to mate with each other. Once mated, one or more electrical terminals of the receptacle 130 (e.g., a terminal 132 inserted into the opening 115) may be electrically connected to one or more corresponding contact pins of the header 140 (e.g., the contact pin 125). In some embodiments, the terminal 132 may be crimped onto a wire of an electrical cable, and the contact pin 125 may be soldered onto a PCB. Thus, when the receptacle 130 and the header 140 are mated with each other, an electrical connection may be made between the wire and a conductive trace of the PCB.

In the example shown in FIG. 1B, the header 140 includes a cavity 142 configured to receive the receptacle 130. The contact pin 125 may be held in the header 140 such that, when the receptacle 130 is inserted into the cavity 142, a mating end of the contact pin 125 forms an electrical connection with a mating end of the terminal 132. Additionally, or alternatively, the header 140 may include one or more features (e.g., hold-down 144) configured to secure the header 140 to a PCB.

In the example shown in FIG. 1B, the receptacle 130 includes a connector position assurance (CPA) feature 134 and a terminal positional assurance (TPA) feature 136. In some embodiments, the CPA feature 134 may be in one of at least two configurations, such as a disengaged configuration and an engaged configuration. When the receptacle 130 is not mated with any header, the CPA feature 134 may be in a disengaged configuration, and may be prevented from moving into the engaged configuration. When the receptacle 130 is mated with a header (e.g., the header 140), the CPA feature 134 may be allowed to move into the engaged configuration, where the CPA feature 134 may prevent the receptacle 130 and the header 140 from being unmated (e.g., due to vibration in an operating environment). In some embodiments, the TPA feature 136 may be engaged to prevent one or more terminals (e.g., the terminal 132) from being dislocated within the receptacle 130 (e.g., due to vibration in an operating environment). Additionally, or alternatively, the TPA feature 136 may be used to ensure that an electrical connection is made only when a terminal is in a desired position.

Figure 2B:
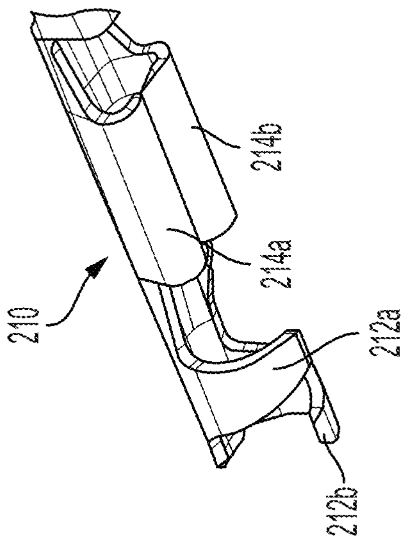
FIG. 2B shows the illustrative barrels 212*a*, 212*b*, 214*a*, and 214*b* of FIG. 2A in a crimped configuration, in accordance with some embodiments.
Figure 2A:
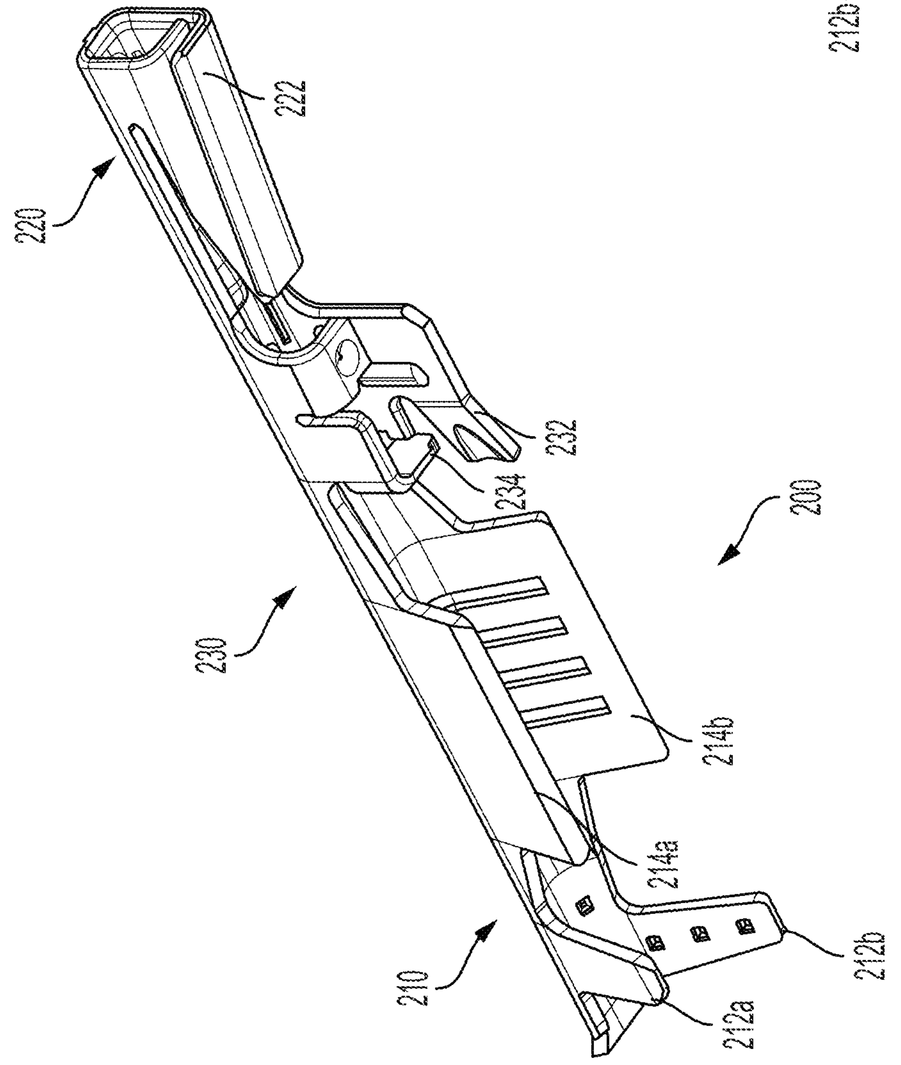
FIG. 2A shows an illustrative electrical terminal 200, in accordance with some embodiments.

FIG. 2A shows an illustrative electrical terminal 200, in accordance with some embodiments. The terminal 200 may be used in any suitable connector, such as the illustrative connector 100 shown in FIGS. 1A-B. For instance, the terminal 200 may be used as the illustrative terminal 132 shown in FIG. 1B.

In the example of FIG. 2A, the terminal 200 includes a crimping end 210 and a mating end 220. The crimping end 210 may be configured to be crimped onto a wire of an electrical cable. For instance, the crimping end 210 may include one or more barrels (e.g., 212*a* and 212*b*) configured to be crimped onto an insulated portion of the electrical cable, and/or one or more barrels (e.g., 214*a* and 214*b*) configured to be crimped onto a stripped portion of the electrical cable, where insulation has been stripped away and the conductive wire is exposed. FIG. 2B shows the illustrative barrels 212*a*, 212*b*, 214*a*, and 214*b* of FIG. 2A in a crimped configuration, in accordance with some embodiments.

In some embodiments, the barrels 212*a* and 212*b* may be offset from each other, so that when crimped, the barrels 212*a* and 212*b* may hold the insulation portion of the cable at different locations along a length of the cable, which may improve retention. Additionally, or alternatively, the barrels 214*a* and 214*b* may be elongated along a length of the terminal 200 to provide a larger contact region (and hence improved electrical connection) between the terminal 200 and the wire onto which the terminal 200 is crimped. The inventors have recognized and appreciated that one or more of these techniques may be used to improve vibration endurance (e.g., in an automotive application).

In the example of FIG. 2A, the mating end 220 includes a contact beam 222 configured to mate with a corresponding contact pin (e.g., the illustrative contact pin 125 shown in FIGS. 1A-B). For instance, the contact beam 222 may be a box-shaped beam configured to receive the contact pin 125. However, it should be appreciated that aspects of the present disclosure are not limited to the use of a box-shaped beam, as other mating contact configurations may also be suitable.

In the example of FIG. 2A, the terminal 200 includes an intermediate portion 230 between the crimping end 210 and the mating end 220. In some embodiments, the intermediate portion 230 may include a locking feature 232 configured to engage with one or more features of the receptacle 130, for example, to retain the terminal 200 at a desired position within the receptacle 130. For instance, the locking feature 232 may be biased outwardly from a center line of the terminal 200, and may fit into a corresponding recess in the receptacle 130 to prevent the terminal 200 from being dislocated (e.g., due to vibration in an operating environment).

Additionally, or alternatively, the intermediate portion 230 may include a blocking feature 234 configured to engage with a TPA feature (e.g., the illustrative TPA feature 136 shown in FIG. 1B). For example, as explained below in connection with FIG. 4C, when a TPA feature is in an engaged configuration, a protrusion of the TPA feature may come into contact with the blocking feature 234, thereby preventing the terminal 200 from being dislocated.

The inventors have recognized and appreciated that it may be desirable to provide different connector configurations for use in different applications. For instance, it may be desirable to provide connectors that have different configurations (e.g., top vs. side latch, staggered vs. side-to-side, single vs. double row, etc.) but are capable of receiving terminals of a same design (e.g., the illustrative terminal 200 shown in FIG. 2A). This may simplify manufacturing and/or installation. Furthermore, cost of tooling to make a terminal may be high relative to cost of the terminal itself, and overall costs may be reduced by amortizing the tooling cost over a larger number of terminals. Therefore, it may be desirable to provide a terminal design that may be used in many different connector configurations. However, it should be appreciated that aspects of the present disclosure are not limited to the use of a universal terminal design.

FIGS. 3A-F show, respectively, illustrative connectors 300A-F, in accordance with some embodiments. For instance, each of the connectors 300A-F may be configured for use with terminals having the illustrative design shown in FIG. 2A.

Figure 3A:
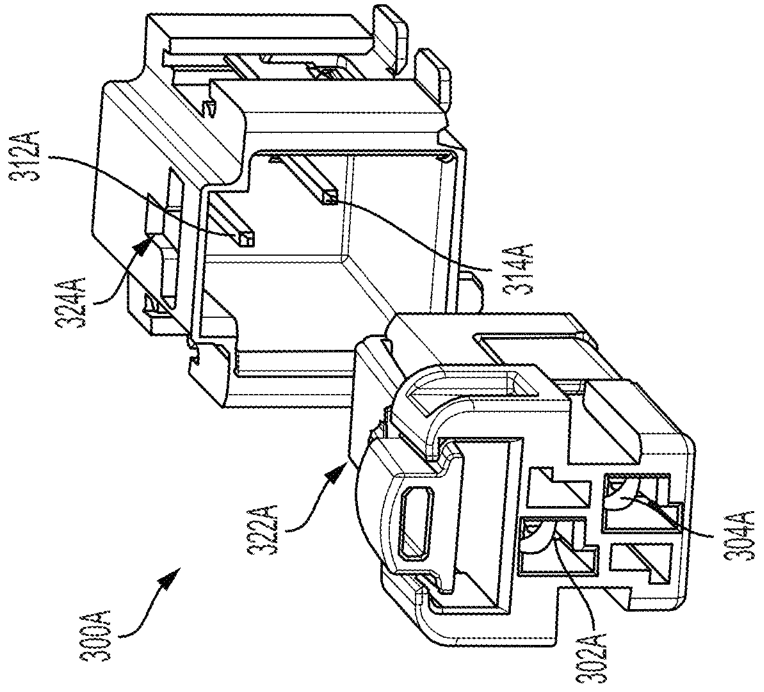
FIGS. 3A-F show, respectively, illustrative connectors 300A-F, in accordance with some embodiments.

In the example shown in FIG. 3A, the connector 300A includes a receptacle having two terminals 302A and 304A, and a header having two pins 312A and 314A. The terminals 302A and 304A may be disposed in a staggered configuration. For instance, the terminal 302A may be offset from the terminal 304A both horizontally and vertically, and likewise for the pins 312A and 314A. In this manner, a horizontal distance between the pins 312A and 314A may be reduced while maintaining an overall distance between the pins 312A and 314A (square root of sum of square of horizontal distance and square of vertical distance). Thus, a board pitch may be reduced while still allowing the use of sufficiently large conductors for carrying high currents.

In this disclosure, a "vertical" direction may be a direction that is orthogonal to a PCB onto which a connector is mounted, and a "horizontal" direction may be a direction that is parallel to the PCB. Moreover, a first feature of the connector may be said to be "above" (respectively, "below") a second feature of the connector if the first feature is vertically offset from the second feature and is further from (respectively, closer to) the PCB than the second feature. Likewise, a "top" of the connector may be facing away from the PCB, and a "bottom" of the connector may be facing towards the PCB.

Returning to the example of FIG. 3A, the receptacle of the connector 300A includes a latch 322A (mostly obscured in this view), and the header of the connector 300A includes an opening 324A configured to engage the latch 322A. The latch 322A and the opening 324A may be located at a top of the connector 300A, and may engage each other when the receptacle is mated with the header. When engaged, the latch 322A and the opening 324A may prevent the receptacle and the header from becoming unmated (e.g., due to vibration in an operating environment).

Figure 3B:
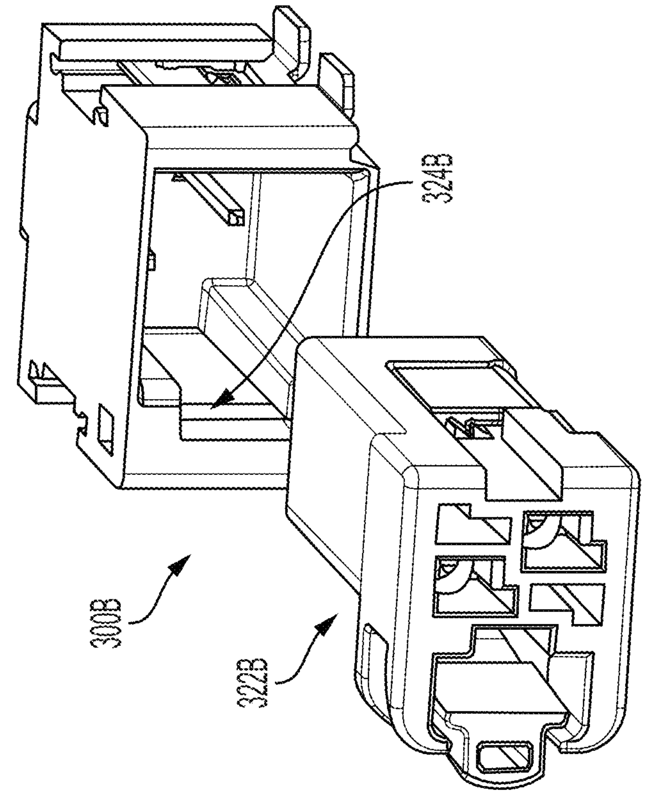

In the example shown in FIG. 3B, the connector 300B is similar to the illustrative connector 300A shown in FIG. 3A, except a latch 322B (mostly obscured in this view) and a corresponding opening 324B may be disposed at a side of the connector 300B, instead of a top of the connector 300B. Such a side latch may be used in an application where vertical space is limited, and/or there is limited access from above.

Figure 3D:
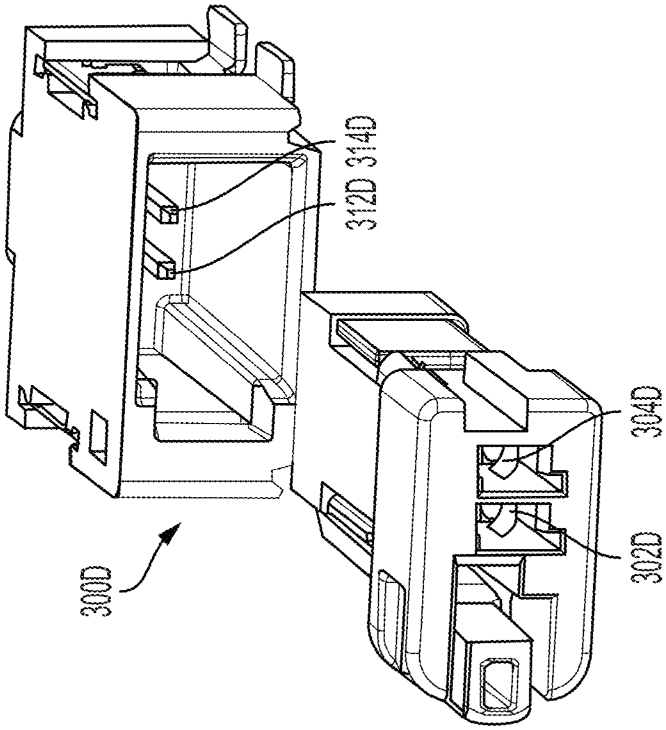
Figure 3C:
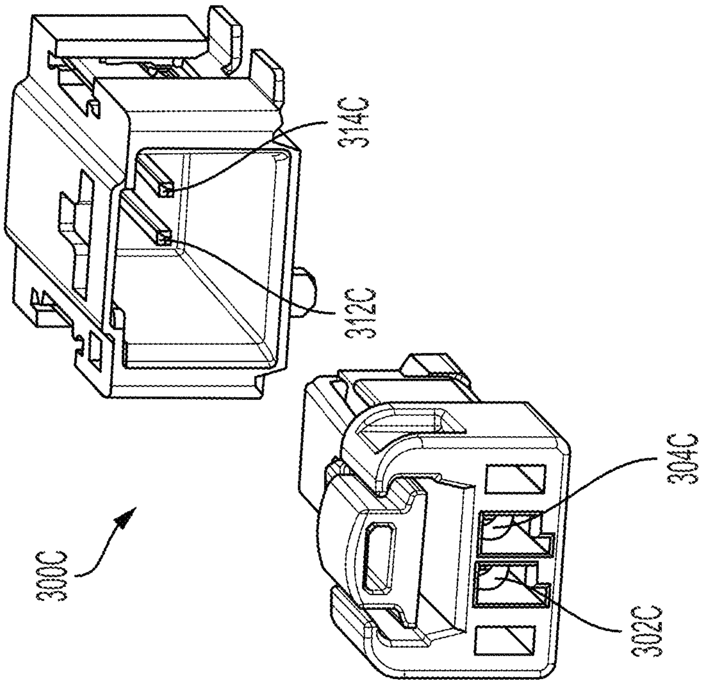

In the example shown in FIG. 3C, the connector 300C is similar to the illustrative connector 300A shown in FIG. 3A, except terminals 302C and 304C are in a side-to-side configuration, instead of a staggered configuration, and likewise for pins 312C and 314C. For instance, the terminals 302C and 304C may be in a same horizontal row, and likewise for the pins 312C and 314C. Such a side-to-side configuration may be used in an application where vertical space is limited. Moreover, using different configurations in a same environment may reduce a likelihood of mating connectors that are not intended to be mated together.

In the example shown in FIG. 3D, the connector 300D is similar to the illustrative connector 300B shown in FIG. 3B, except terminals 302D and 304D are in a side-to-side configuration, instead of a staggered configuration, and likewise for pins 312D and 314D. For instance, the terminals 302D and 304D may be in a same horizontal row, and likewise for the pins 312D and 314D.

Figure 3F:
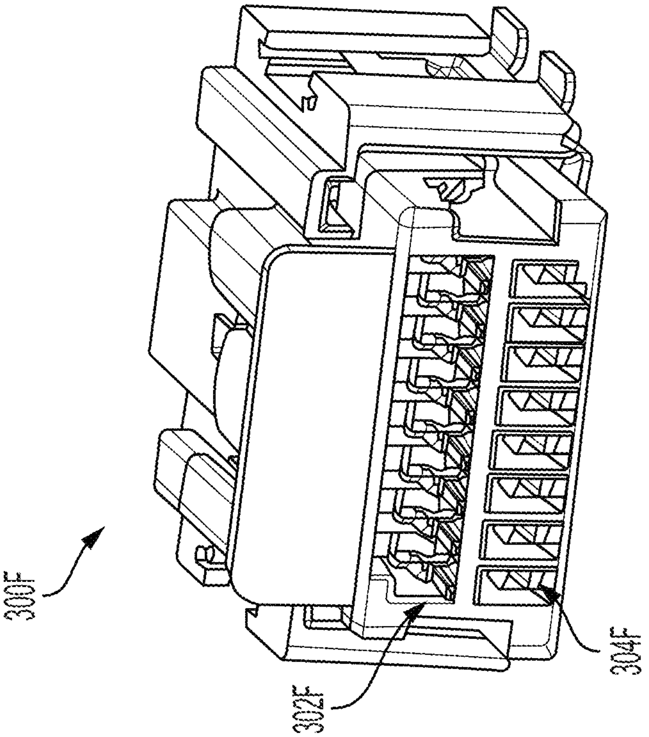
Figure 3E:
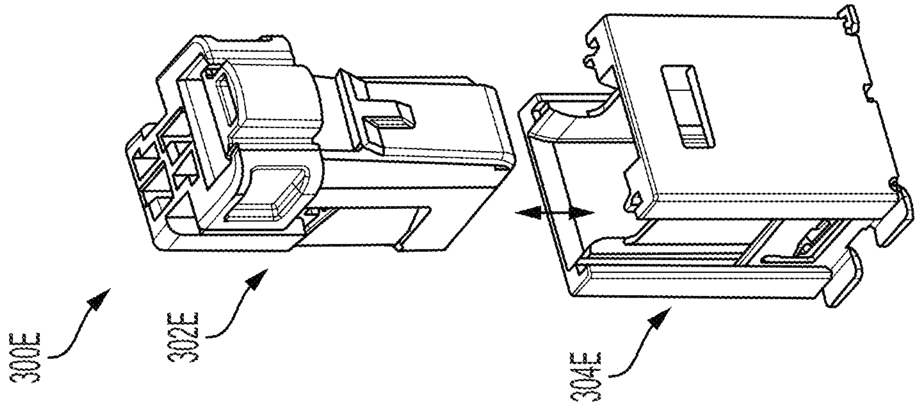

In the example shown in FIG. 3E, the connector 300E is similar to the illustrative connector 300A shown in FIG. 3A, except a mating direction between a header 302E and a receptacle 304E of the connector 300E is vertical, as opposed to horizontal.

In the example shown in FIG. 3F, the connector 300F has two horizontal rows of terminals and two horizontal rows of corresponding contact pins. For instance, there may be a top row 302F and a bottom row 304F. In this example, terminals in the top row 302F may be oriented such that one or more engagement features (e.g., the illustrative locking feature 232 and the illustrative blocking feature 234 shown in FIG. 2A) may face upward, so as to engage a top TPA feature, whereas terminals in the bottom row 304F may be oriented such that one or more engagement features (e.g., the illustrative locking feature 232 and the illustrative blocking feature 234 shown in FIG. 2A) may face downward, so as to engage a bottom TPA feature. However, it should be appreciated that aspects of the present disclosure are not limited to any particular orientation of terminals, nor to the use of any TPA feature.

Figure 4A:
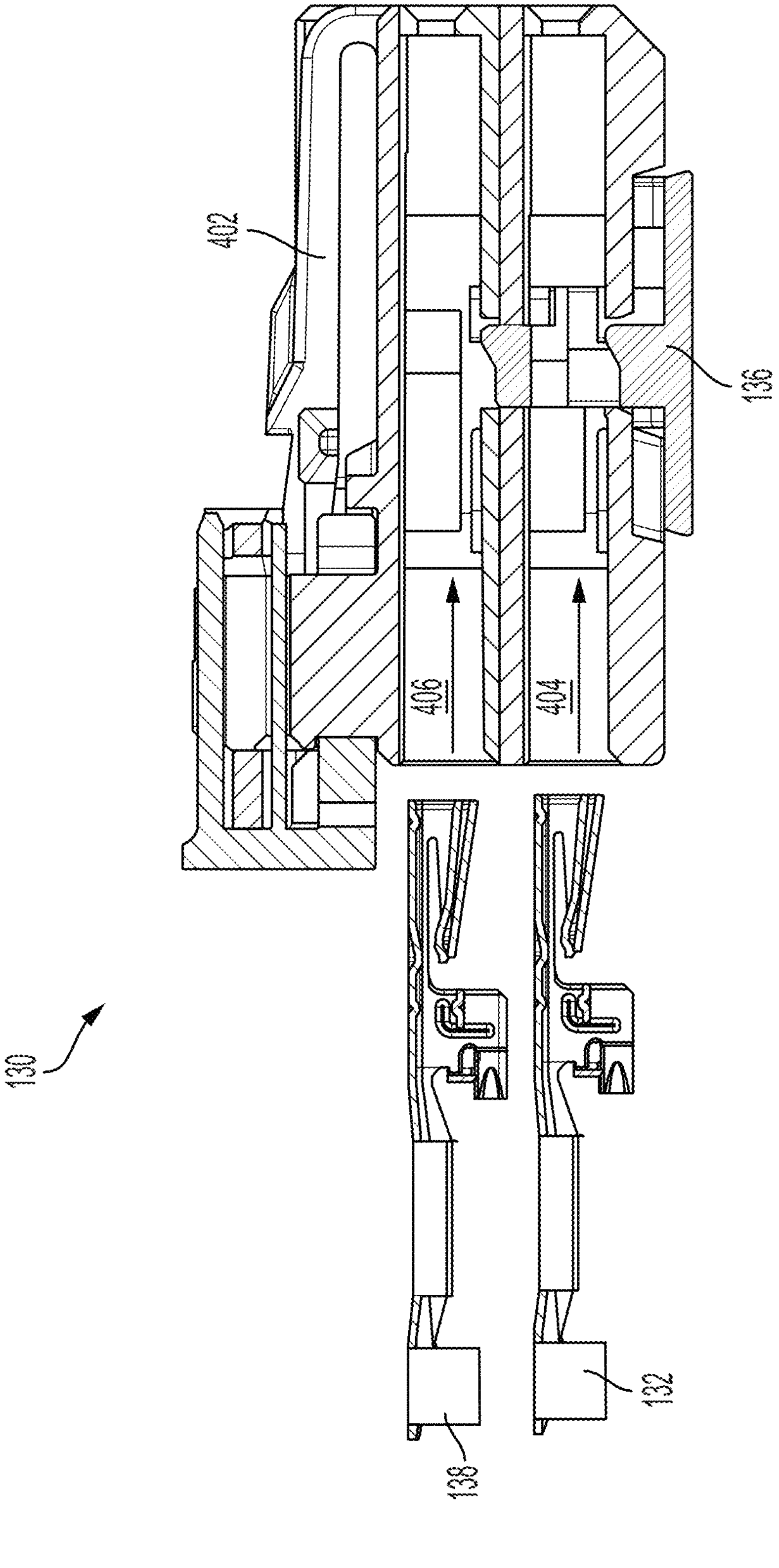
FIGS. 4A-D show cross-sectional views of the illustrative receptacle 130 shown in FIG. 1B, in accordance with some embodiments.
Figure 4B:
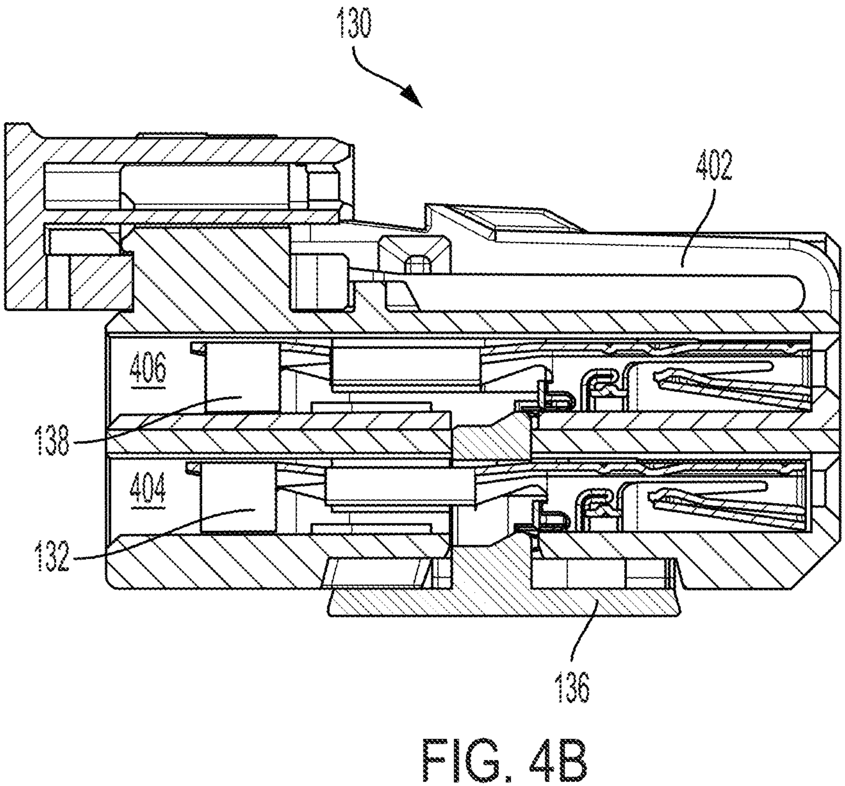
Figure 4C:
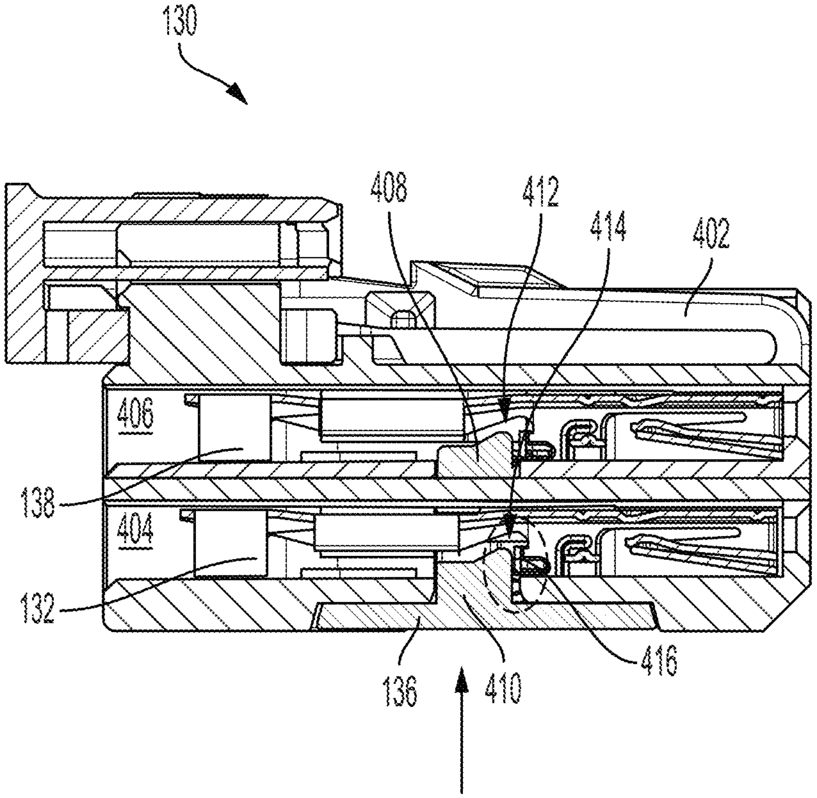

FIGS. 4A-C show cross-sectional views of the illustrative receptacle 130 shown in FIG. 1B, in accordance with some embodiments. In the example of FIG. 4A, a housing 402 of the receptacle 130 includes elongated cavities 404 and 406 configured to receive terminals 132 and 138, respectively. The terminal position assurance (TPA) feature 136 is shown in FIG. 4A in a disengaged configuration, providing sufficient clearance in the cavities 404 and 406 to allow insertion of the terminals 132 and 138.

In the example of FIG. 4B, the terminals 132 and 138 are fully inserted into the cavities 404 and 406, respectively. The TPA feature 136 may then be engaged to hold the terminals 132 and 138 in their respective positions in the housing 402. For instance, in the example of FIG. 4C, the TPA feature 136 is pushed into the housing 402 to engage the terminals 132 and 138.

In some embodiments, the TPA feature 136 may include one or more protrusions configured to engage, respectively, one or more terminals inserted into the housing 402. For instance, in the example of FIG. 4C, the TPA feature 136 includes a protrusion 408 configured to fit into a recess 412 formed in the terminal 138, as well as a protrusion 410 configured to fit into a recess 414 formed in the terminal 132. The protrusions 408 and 410 may be of different heights. For instance, the protrusion 410 may be shorter than the protrusion 408, because the terminal 132 may be disposed at a bottom row of the receptacle 130, whereas the terminal 138 may be disposed at a top row.

In some embodiments, the terminal 132 may include a blocking feature 416 that is similar to the illustrative blocking feature 234 shown in FIG. 2A and discussed above. When the TPA feature 136 is pushed into the housing 402, the protrusion 410 may be disposed adjacent the blocking feature 416 of the terminal 132. In this engaged configuration, a movement of the terminal 132 in a withdrawal direction may cause the blocking feature 416 to come into contact with the protrusion 410, thereby preventing of the terminal 132 from being withdrawn from the cavity 404.

Figure 4D:
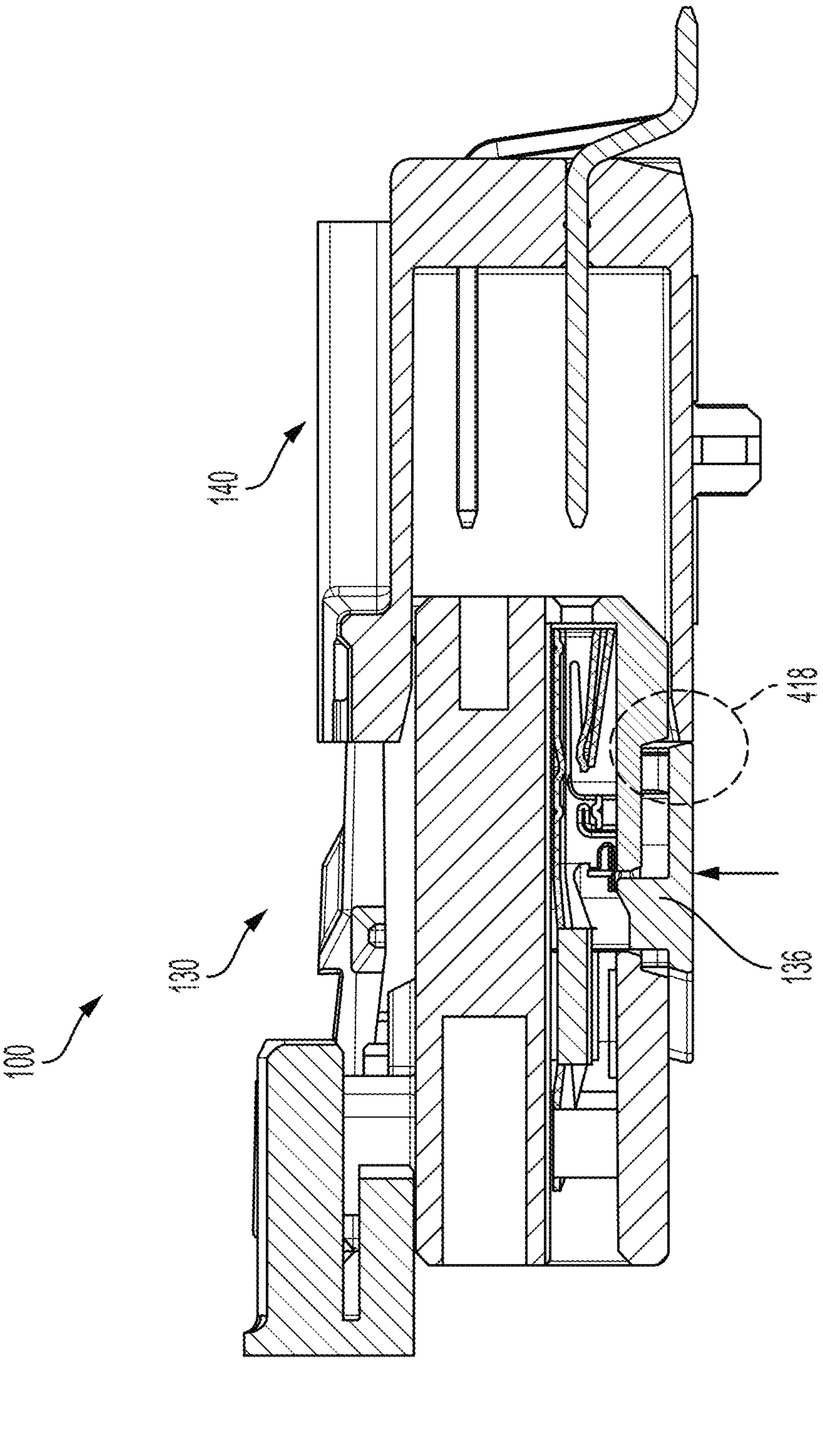

FIG. 4D shows a cross-sectional view of the illustrative connector 100 shown in FIG. 1B, in accordance with some embodiments. In this example, the TPA feature 136 is in a disengaged configuration, and may block the header 140 from becoming fully mated with the receptacle 130. For instance, as shown at 416, the TPA feature 136 may, in the disengaged configuration, be vertically aligned with a lower edge of the header 140, thereby blocking the header 140. Once the TPA feature 136 is pushed upward to be in an engaged configuration, there may be sufficient clearance for the receptacle 130 to be inserted into the header 140. In this manner, electrical connections may be made between terminals of the receptacle 130 and respective contact pins of the header 140 only when the TPA feature 136 is in an engaged position, which may ensure that the terminals of the receptacle are in desired positions when electrical connections are made.

Figure 5A:
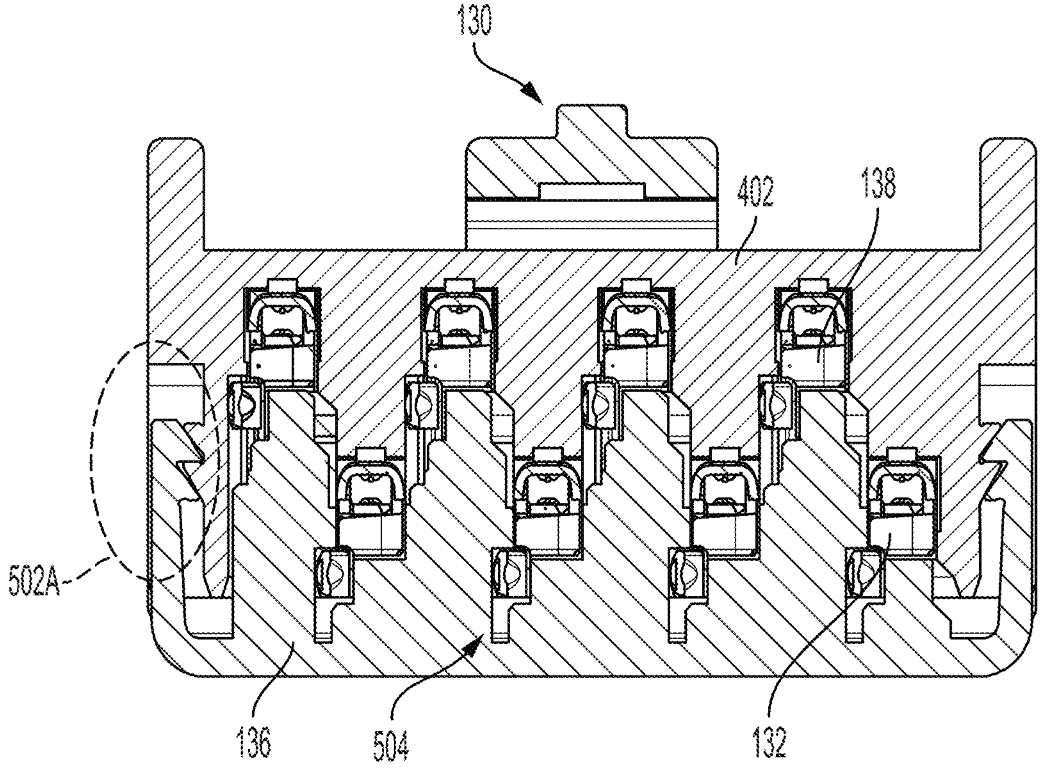
FIGS. 5A-B show further cross-sectional views of the illustrative receptacle 130 shown in FIG. 1B, in accordance with some embodiments.
Figure 5B:
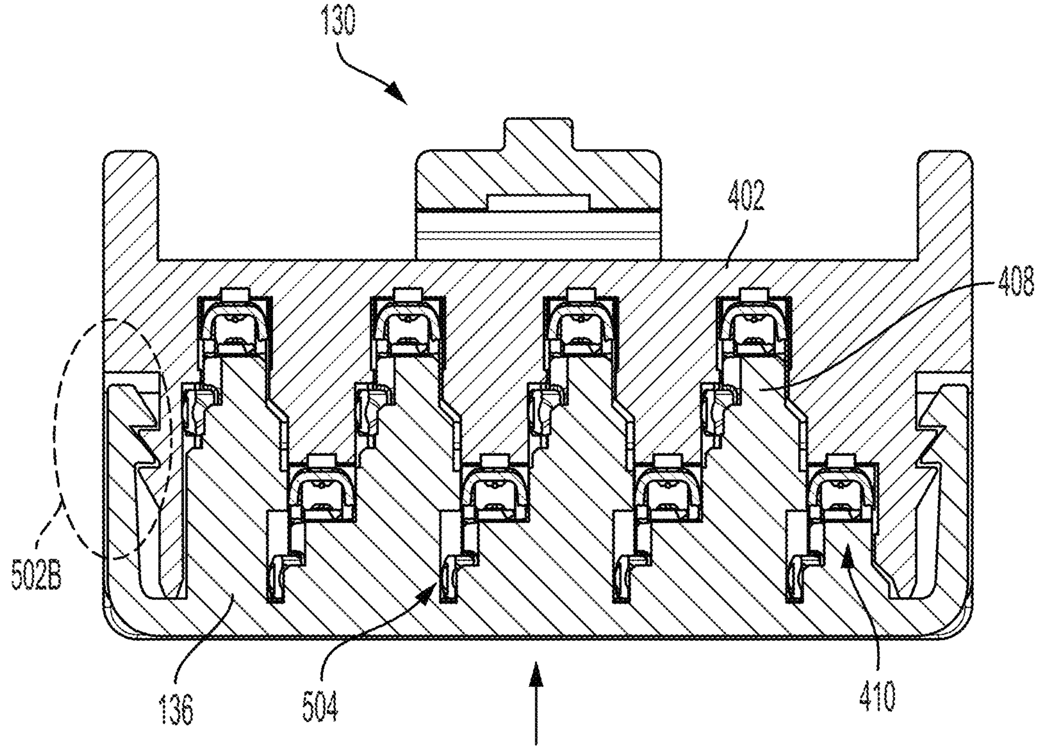

FIGS. 5A-B show further cross-sectional views of the illustrative receptacle 130 shown in FIG. 1B, in accordance with some embodiments. The views shown in FIGS. 5A-B may be orthogonal to the views shown in FIGS. 4A-C. In the example of FIG. 5A, the TPA feature 136 is in a disengaged configuration. For instance, as shown at 502A, the housing 402 may include two protrusions configured to engage with protrusions of the TPA 136. In some embodiments, when the TPA feature 136 is in a disengaged configuration, only one of the two protrusions of the housing 402 (e.g., a lower protrusion) may be engaged with the TPA feature 136. In this manner, the TPA feature 136 may be attached to the housing 402, while leaving sufficient clearance for insertion of terminals (e.g., the illustrative terminals 132 and 138).

In some embodiments, when the TPA feature 136 is in an engaged configuration (e.g., as shown in FIG. 5B), both of the protrusions of the housing 402 may be engaged with the TPA feature 136 (e.g., as shown at 502B). In this manner, protrusions of the TPA feature 136 (e.g., the illustrative protrusions 408 and 410) may fit into corresponding recesses of inserted terminals (e.g., the illustrative terminals 132 and 138) to retain the inserted terminals at their respective positions.

In some embodiments, the TPA feature 136 may include one or more recesses (e.g., a recess 504) configured to receive a locking feature of a corresponding inserted terminal (e.g., the illustrative locking feature 232 shown in FIG. 2A). For instance, in the example shown in FIG. 5B, the locking feature may be vertically aligned with the recess 504 when the corresponding terminal is correctly inserted, and the recess 504 may fit over the locking feature when the TPA feature 136 is pushed up into the engaged position.

Figure 6A:
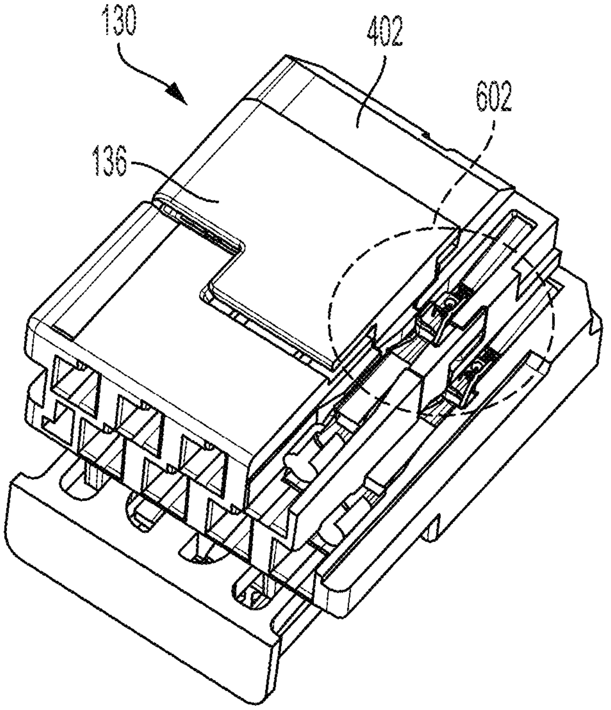
FIG. 6A shows a bottom view of the illustrative receptacle 130 shown in FIG. 1B, partially cut away to show illustrative locking features of inserted terminals, in accordance with some embodiments.
Figure 6B:
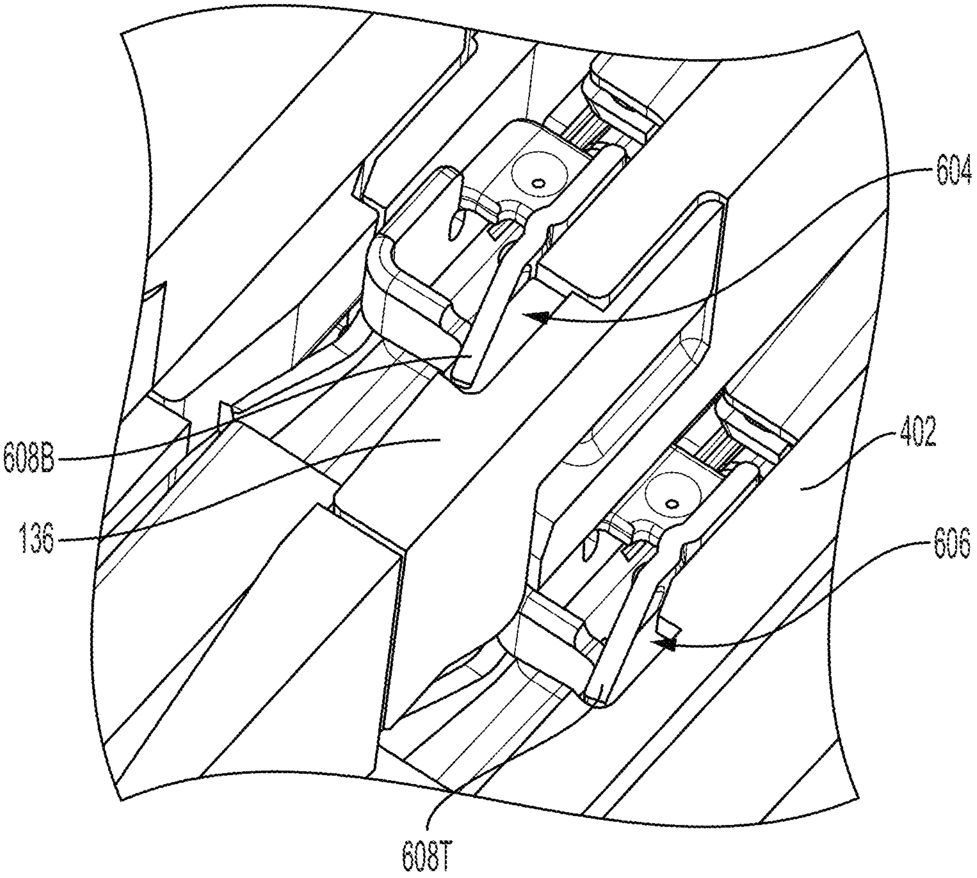
FIG. 6B shows an enlarged view of an area 602 of FIG. 6A.

FIG. 6A shows a bottom view of the illustrative receptacle 130 shown in FIG. 1B, partially cut away to show illustrative locking features of inserted terminals, in accordance with some embodiments. FIG. 6B shows an enlarged view of an area 602 of FIG. 6A.

In the example shown in FIGS. 6A-B, each of the housing 402 and the TPA feature 136 has one or more recesses configured to receive a locking feature of a inserted terminal. For instance, the housing 402 may have recesses (e.g., a recess 606) configured to receive locking features of inserted terminals at a top row (e.g., a locking feature 608T), whereas the TPA feature 136 may have recesses (e.g., a recess 604) configured to receive locking features of inserted terminals at a bottom row (e.g., a locking feature 608B).

The inventors have recognized and appreciated that spacing between terminals (and therefore board pitch) may be reduced by providing one or more recesses at the TPA feature 136, as opposed to all recesses being provided at the housing 402. However, it should be appreciated that aspects of the present disclosure are not limited to having any recess at the TPA feature 136 to receive a locking feature of an inserted terminal, or to the use of any TPA feature at all.

Figure 7:
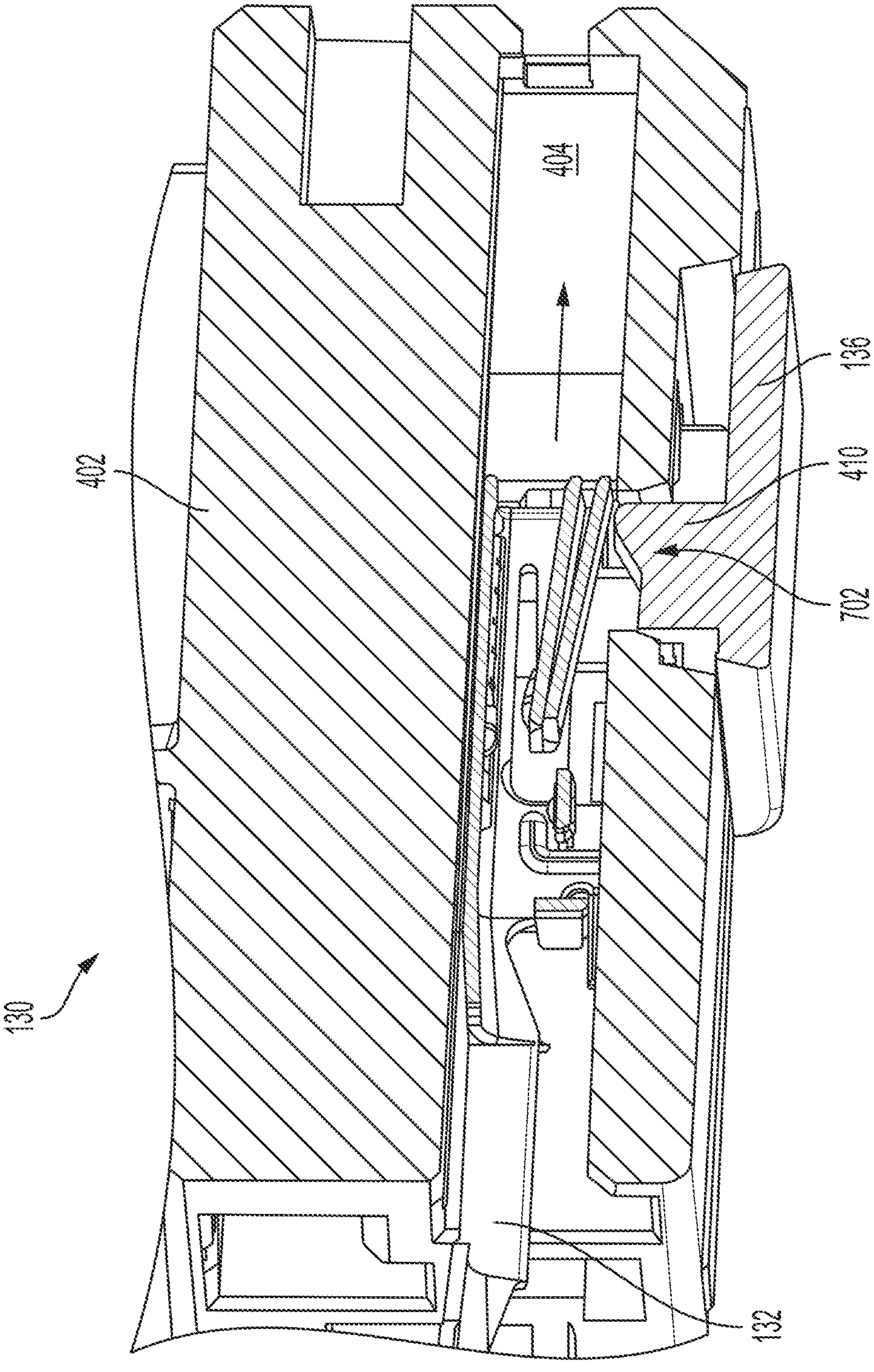
FIG. 7 shows another cross-sectional view of the illustrative receptacle 130 shown in FIG. 1B, in accordance with some embodiments.

FIG. 7 shows another cross-sectional view of the illustrative receptacle 130 shown in FIG. 1B, in accordance with some embodiments. In this example, the protrusion 410 of the TPA feature 136 has a ramped top profile 702 configured to facilitate gliding of the terminal 132 into the cavity 404. For instance, the ramped top profile 702 may prevent damage of the terminal 132 due to stubbing during insertion.

Figure 8:
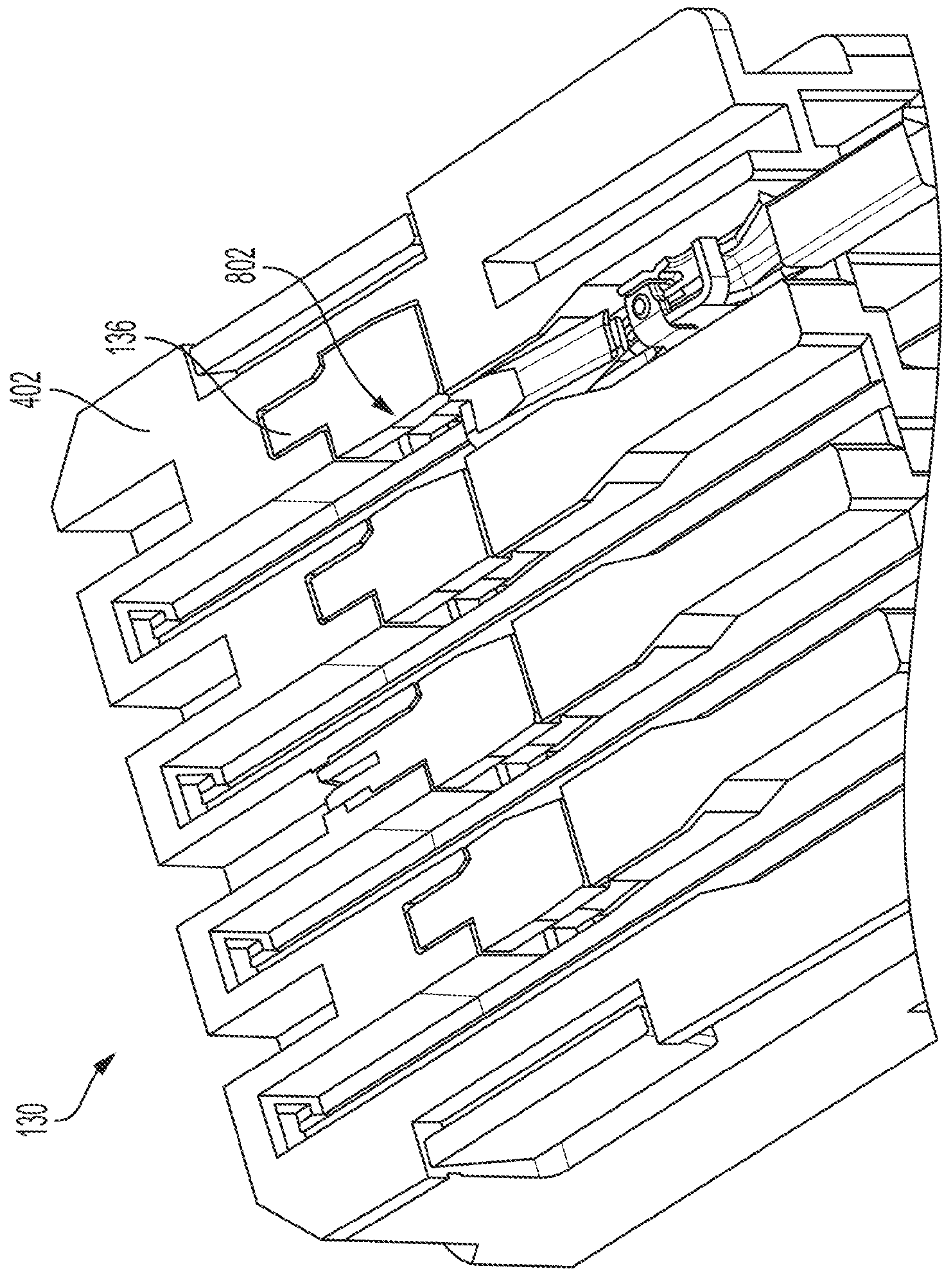
FIG. 8 shows another cross-sectional view of the illustrative receptacle 130 shown in FIG. 1B, in accordance with some embodiments.

FIG. 8 shows another cross-sectional view of the illustrative receptacle 130 shown in FIG. 1B, in accordance with some embodiments. In this example, the TPA feature 136 has a tapered side profile 802 configured to facilitate gliding of a terminal into a cavity adjacent the tapered side profile

802. For instance, the tapered side profile 802 may prevent damage of the terminal due to stubbing during insertion.

Figure 9A:
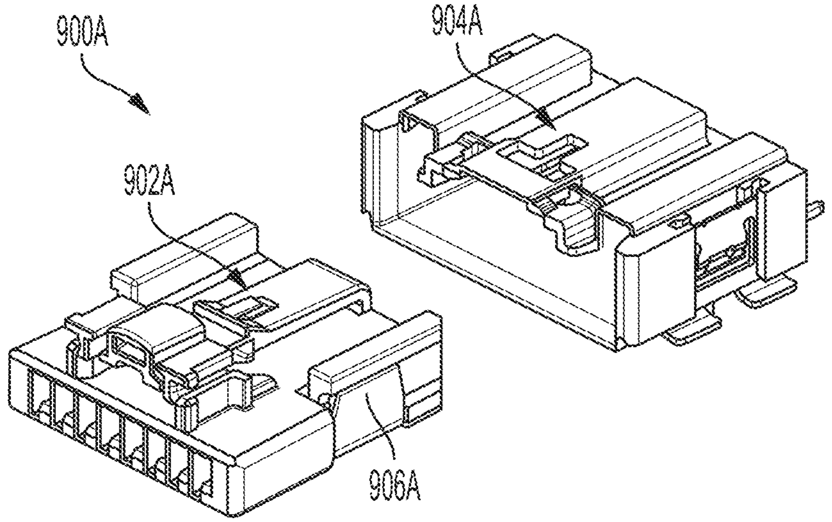
FIG. 9A shows an illustrative connector 900A, in accordance with some embodiments.

FIG. 9A shows an illustrative connector 900A, in accordance with some embodiments. In this example, the connector 900A has a receptacle with a latch 902A, as well as a header with an opening 904A configured to engage the latch 902A. The latch 902A and the opening 904A may engage each other when the receptacle is mated with the header. When engaged, the latch 902A and the opening 904A may prevent the receptacle and the header from becoming unmated (e.g., due to vibration in an operating environment).

In the example of FIG. 9A, the connector 900A also includes a TPA feature 906A, which may be similar to the illustrative TPA feature 136 in the example of FIG. 1B. For instance, the TPA feature 906A may be configured to retain terminals inserted into the receptacle of the connector 900A.

Figure 9B:
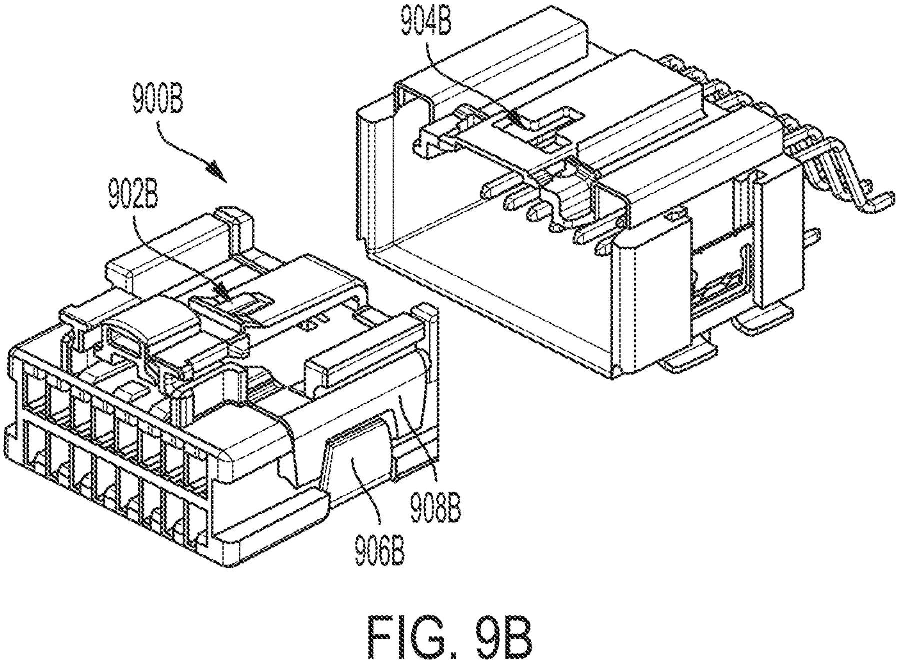
FIG. 9B shows an illustrative connector 900B, in accordance with some embodiments.

FIG. 9B shows an illustrative connector 900B, in accordance with some embodiments. The connector 900B may be similar to the illustrative connector 900A shown in FIG. 9A, although the connector 900A may have a single row of terminals, whereas the connector 900B may have two rows of terminals. Furthermore, in some embodiments, the connector 900B may have two TPA features, instead of one. For instance, a bottom TPA feature 906B may be configured to engage with terminals in a bottom row, and a top TPA feature 908B may be configured to engage with terminals in a top row.

In the example of FIG. 9B, the connector 900B includes a receptacle with a latch 902B and a header with an opening 904B configured to engage the latch 902B. The latch 902B and the opening 904B may engage each other when the receptacle is mated with the header. When engaged, the latch 902B and the opening 904B may prevent the receptacle and the header from becoming unmated (e.g., due to vibration in an operating environment). However, unlike the illustrative latch 902A in the example of FIG. 9A, which is located at a receptacle housing, the latch 902B in the example of FIG. 9B is located at the top TPA feature 908B.

The inventors have recognized and appreciated that molding operations may be simplified by having a latch at a top TPA feature (e.g., as in the example of FIG. 9B), instead of a receptacle housing (e.g., as in the example of FIG. 9A). For instance, a number of mold slides may be reduced, thereby reducing manufacturing costs. However, it should be appreciated that aspects of the present disclosure are not limited to any particular location for a latch, or to the use of any latch at all.

Figure 10:
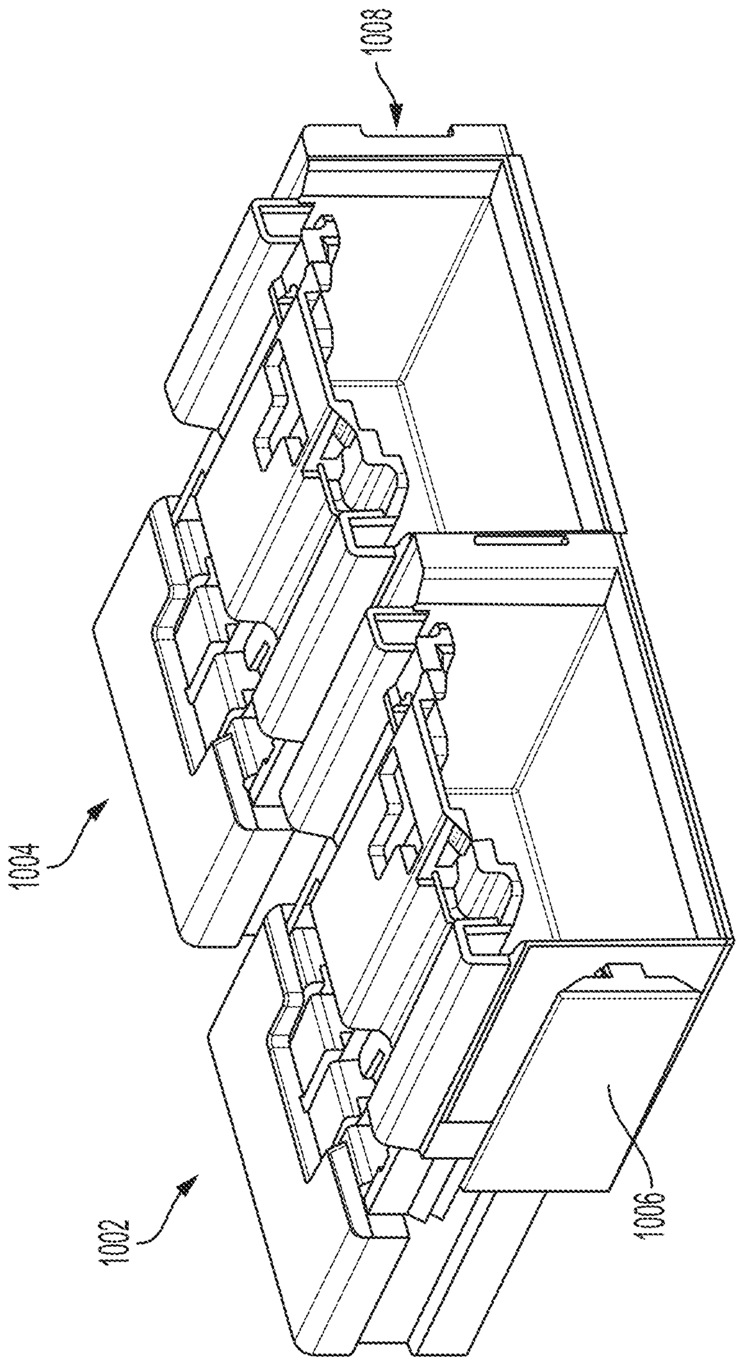
FIG. 10 shows illustrative header housings 1002 and 1004, in accordance with some embodiments.

FIG. 10 shows illustrative header housings 1002 and 1004, in accordance with some embodiments. In this example, the header housings 1002 and 1004 are configured to be attached to each other. For instance, the header housing 1002 may include a tongue 1006 and the header housing 1004 may include a similar tongue (obscured in this view), while the header housing 1004 may include a groove 1008 and the header housing 1002 may include a similar groove (obscured in this view). The tongue of the header housing 1004 and the groove of the header housing 1002 may be configured to sliding engage each other, thereby attaching the header housings 1002 and 1004 to each other. In this manner, a number of desired electrical connections may be provided by attaching two or more connectors together.

In the example of FIG. 10, the tongue of the header housing 1004 and the groove of the header housing 1002 form a dovetail joint, which may provide improved tensile strength. However, it should be appreciated that aspects of the present disclosure are not limited to the use of any particular technique for joining together multiple connectors, or to the used of joined connectors at all.

Figure 11B:
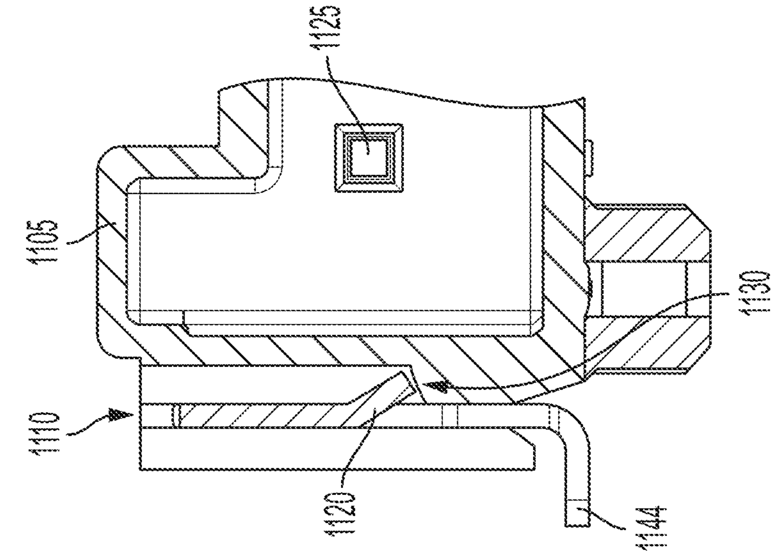
FIG. 11B shows a cross-sectional view of the illustrative header 1100 of FIG. 11A, in accordance with some embodiments.
Figure 11A:
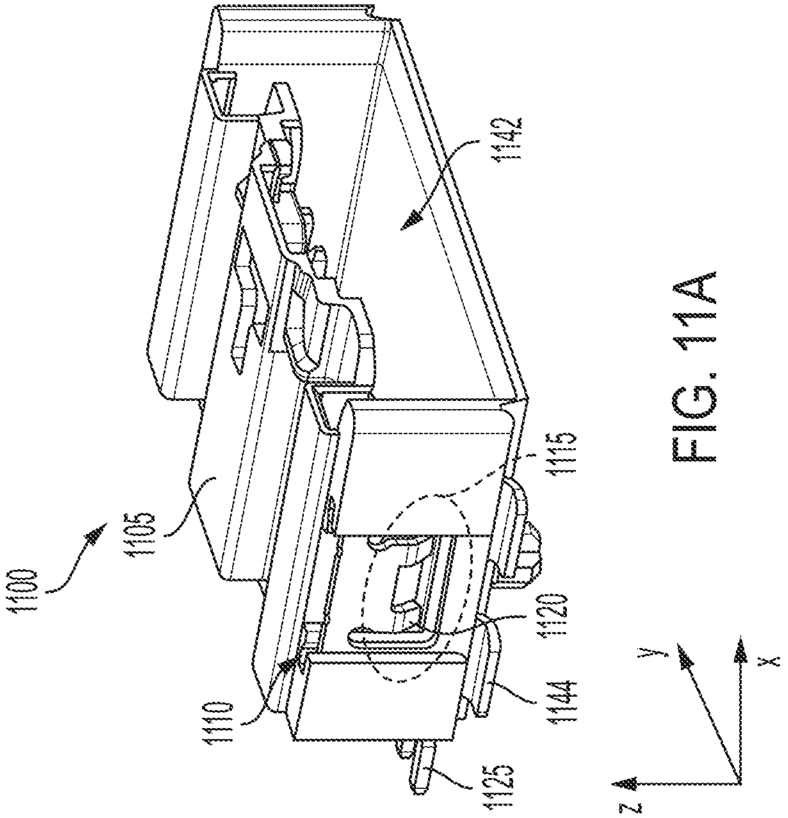
FIG. 11A shows an illustrative header 1100, in accordance with some embodiments.

FIG. 11A shows an illustrative header 1100, in accordance with some embodiments. The header 1100 may be used in any suitable connector, such as the illustrative connector 100 shown in FIGS. 1A-B. For instance, the header 1100 may be used as the illustrative header 140 shown in FIG. 1B.

In the example shown in FIG. 11A, the header 1100 has a housing 1105 with a cavity 1142 configured to receive a receptacle (e.g., the illustrative receptacle 130 shown in FIG. 1B). One or more contact pins, such as a contact pin 1125, may be held in the housing 1105 such that, when a receptacle is inserted into the cavity 1142, a mating end of the contact pin 1125 forms an electrical connection with a mating end of a terminal of the receptacle (e.g., the illustrative terminal 132 shown in FIG. 1B).

In some embodiments, the header 1100 may include one or more features configured to secure the header 1100 to a PCB. In the example shown in FIG. 11A, the header 1100 includes a hold-down 1144 configured to be fastened to the header 1100 and a PCB. For instance, each vertical edge of the hold-down 1144 may be configured to slide into a respective vertical groove formed in the housing 1005, such as a groove 1110. In this manner, once the hold-down 1144 is fastened to a PCB, the header 1100 may be prevented from moving laterally (e.g., x or y direction) relative to the PCB.

Additionally, or alternatively, as shown at 1115, the hold-down 1144 may include one or more beams, such as a beam 1120, configured to exert a spring force against the housing 1105. FIG. 11B shows a cross-sectional view of the illustrative header 1100 of FIG. 11A, in accordance with some embodiments. In this example, the beam 1120 has an angled end portion configured to engage a ledge 1130 formed on a side wall of the housing, thereby exerting a downward spring force against the housing 1105. Thus, once the hold-down 1144 is fastened to a PCB, the header 1100 may be prevented from moving vertically (e.g., z direction) relative to the PCB.

Figure 12A:
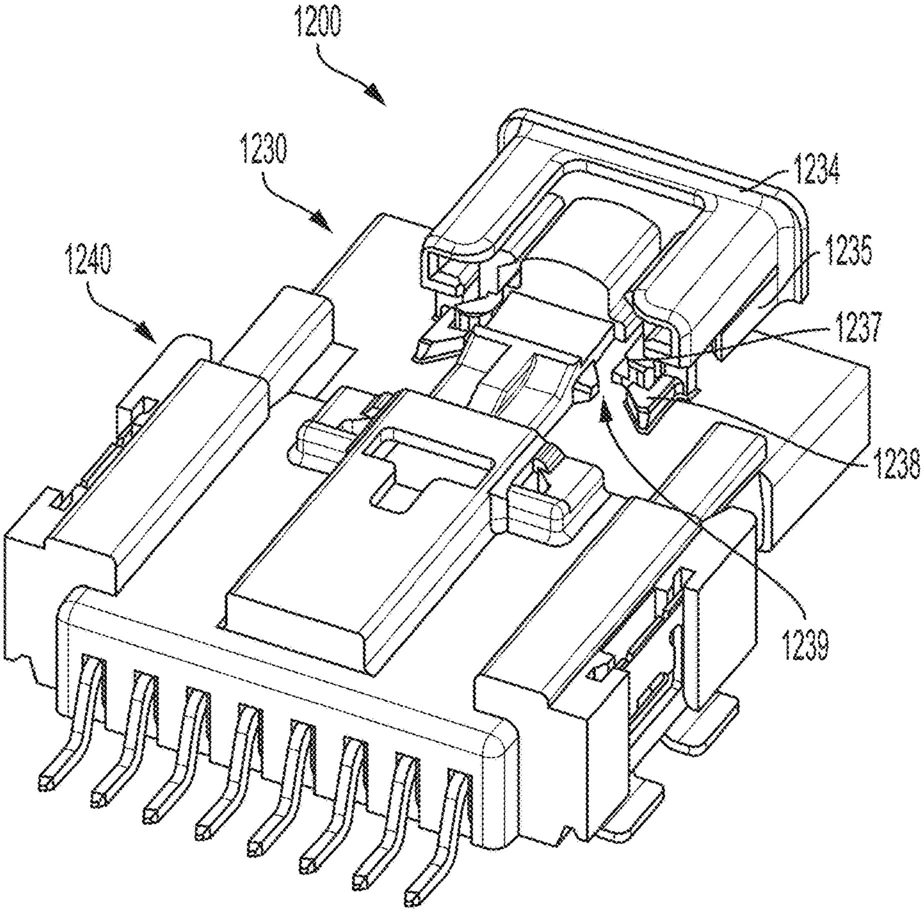
FIG. 12A shows an illustrative connector 1200, in accordance with some embodiments.

Although not visible in FIGS. 11A-B, a hold-down similar to the hold-down 1144 may be fastened to an opposite side of the housing 1105 in a similar manner. Together, these hold-downs may hold the header 1100 in place despite vibration in an operating environment (e.g., in an automotive application). However, it should be appreciated that aspects of the present disclosure are not limited to any particular design for a hold-down, or to the use of any hold-down at all. FIG. 12A shows an illustrative connector 1200, in accordance with some embodiments. The connector 1200 may be similar to the illustrative connector 100 shown in FIG. 1A, and may include a receptacle 1230 and a header 1240 configured to mate with each other.

In some embodiments, the connector 1200 may include a connector position assurance (CPA) feature configured to provide an indication of whether the receptacle 1230 and the header 1240 are properly mated with each other. For instance, in the example shown in FIG. 12A, the connector 1200 includes a CPA feature 1234 that is movable between a disengaged configuration and an engaged configuration.

Figure 12B:
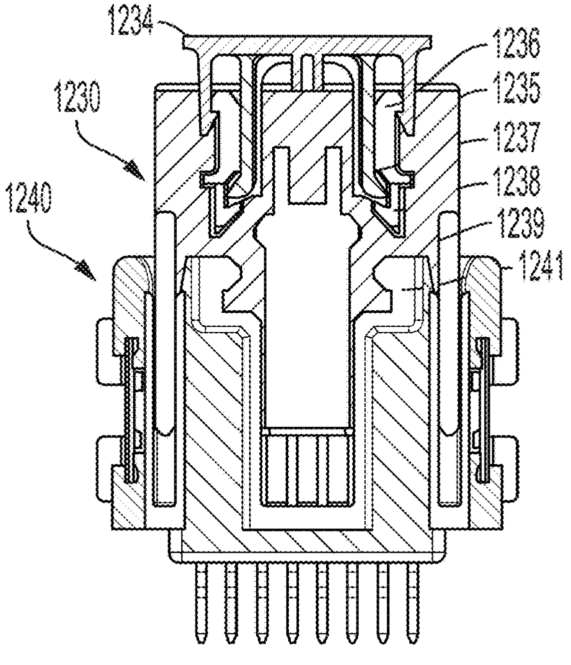
FIG. 12B shows a cross-sectional view of the illustrative connector 1200 of FIG. 12A, in accordance with some embodiments.

FIG. 12B shows a cross-sectional view of the illustrative connector 1200 of FIG. 12A, in accordance with some embodiments. In this view, the receptacle 1230 and the header 1240 are partially mated, and the CPA feature 1234 is in a disengaged configuration.

In some embodiments, the CPA feature 1234 may be attached to the receptacle 1230. For instance, in the example shown in FIGS. 12A-B, the CPA feature 1234 includes a first latch 1235 configured to engage with the receptacle 1230.

The first latch 1235 may be made of a resilient material, and may be configured to exert a spring force against the receptacle 1230, thereby preventing the CPA feature 1234 from being detached from the receptacle 1230. Additionally, or alternatively, an end portion of the first latch 1235 may have a protrusion configured to engage a corresponding protrusion 1236 formed on a housing of the receptacle 1230, thereby preventing the CPA feature 1234 from being detached from the receptacle 1230.

In some embodiments, when the receptacle 1230 is not fully mated with the header 1240, the CPA feature 1234 may be prevented from moving into the engaged configuration. For instance, in the example shown in FIGS. 12A-B, the CPA feature 1234 includes a second latch 1237, and a protrusion 1238 is formed on the housing of the receptacle 1230 to stop the second latch 1237, thereby preventing the CPA feature 1234 from moving into the engaged configuration.

In some embodiments, when the receptacle 1230 becomes fully mated with the header 1240, the CPA feature 1234 may be allowed to move into the engaged configuration, For instance, in the example shown in FIGS. 12A-B, the second latch 1237 may be made of a resilient material, and a protrusion 1241 may be formed on a housing of the header 1240 so that, as the receptacle 1230 is inserted into the header 1240, the protrusion 1241 formed on the header 1240 causes the second latch 1237 to deflect away from the protrusion 1238 formed on the receptacle 1230. Once the second latch 1237 clears the protrusion 1238 formed on the receptacle 1230, the CPA feature 1234 may be pushed fully into the receptacle 1230.

Figure 12C:
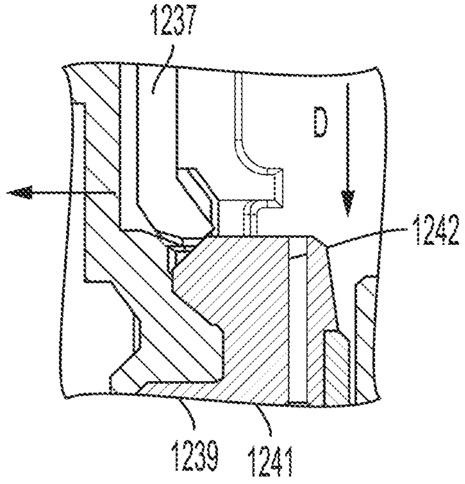
FIG. 12C shows the illustrative latch 1237 contacting the illustrative protrusion 1241 of FIGS. 12A-B, in accordance with some embodiments.

FIG. 12C shows the illustrative latch 1237 contacting the illustrative protrusion 1241 of FIGS. 12A-B, in accordance with some embodiments. In this example, the protrusion 1241 formed on the header 1240 has an angled surface 1242 configured to guide the latch 1237. As the receptacle 1230 is inserted into the header 1240 along a mating direction D, an end portion of the second latch 1237 may glide along the angled surface 1242, which may cause the second latch 1237 to deflect away from the protrusion 1238 formed on the receptacle 1230. (in FIG. 12C, the protrusion 1238 is obscured from view by the protrusion 1241.)

Figure 12D:
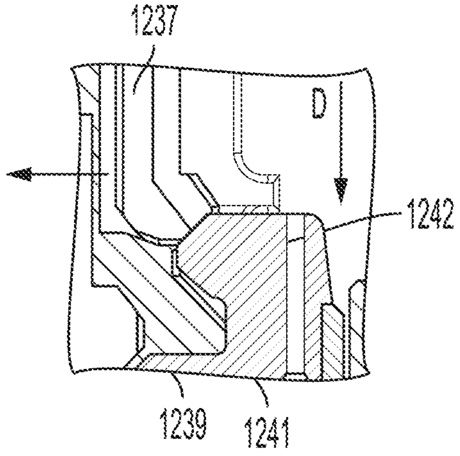
FIG. 12D shows the illustrative latch 1237 being deflected by the illustrative protrusion 1241 of FIGS. 12A-B, in accordance with some embodiments.

FIG. 12D shows the illustrative latch 1237 being deflected by the illustrative protrusion 1241 of FIGS. 12A-B, in accordance with some embodiments. In this example, the second latch 1237 is just about to clear the protrusion 1238 formed on the receptacle 1230. (In FIG. 12C, the protrusion 1238 is obscured from view by the protrusion 1241.) Once the second latch 1237 clears the protrusion 1238, the second latch 1237 may enter a passageway 1239, thereby allowing the CPA feature 1234 to be pushed fully into the receptacle 1230.

Figure 12E:
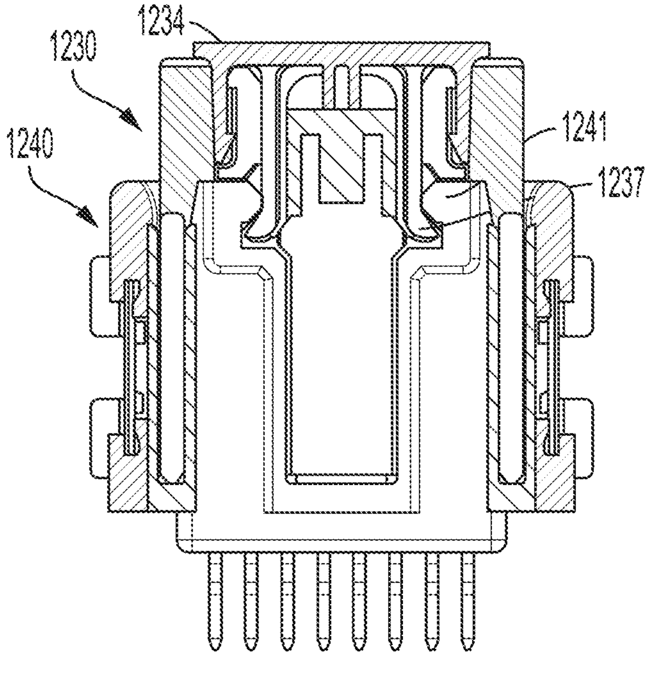
FIG. 12E shows the illustrative CPA feature 1234 of FIGS. 12A-B, in an engaged configuration, in accordance with some embodiments.

FIG. 12E shows the illustrative CPA feature 1234 of FIGS. 12A-B, in an engaged configuration, in accordance with some embodiments. In this configuration, the CPA feature 1234 is pushed fully into the receptacle 1230, and the end portion of the second latch 1237 may engage the protrusion 1241 formed on the header 1240, thereby preventing the receptacle 1230 and the header 1240 from being unmated (e.g., due to vibration in an operating environment).

Techniques described herein may be used in connectors having configurations other than those described above. For example, techniques described herein may be used in mezzanine connectors or in backplane connectors.

Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A first electrical connector, comprising:
- a first housing configured to mate in a mating direction with a second electrical connector having a second housing; and
- a connector position assurance (CPA) feature attached to the first housing, the CPA feature being movable between a disengaged configuration and an engaged configuration and comprising:
  - a first latch configured to attach the CPA feature to the first housing when the CPA feature is in the disengaged configuration; and
  - a second latch configured to attach the CPA feature to the second housing when the CPA feature is in the engaged configuration, wherein:
- the first housing is configured to impede the CPA feature from moving into the engaged configuration when the first and second electrical connectors are not fully mated; and
- the first latch and the second latch each comprise a pair of latch arms, each of the latch arms of the pairs having a length extending parallel to the mating direction.

2. The first electrical connector of claim 1, wherein:
- the first latch comprises a resilient material and is configured to prevent the CPA feature from being detached from the first housing by exerting a spring force against a portion of the first housing.

3. The first electrical connector of claim 1, wherein:
- an end portion of the first latch comprises a protrusion configured to engage a corresponding protrusion on the first housing and to prevent the CPA feature from being detached from the first housing.

4. The first electrical connector of claim 1, further comprising:
- a terminal position assurance (TPA) feature movably coupled to the first housing, the TPA feature being movable between a disengaged configuration and an engaged configuration.

5. The first electrical connector of claim 1, in combination with the second electrical connector, wherein:
- the first housing comprises a protrusion extending from an upper surface of the first housing in a direction perpendicular to the mating direction, the protrusion configured to engage a latch arm of the second latch and to impede the CPA feature from moving into the engaged configuration when the first and second electrical connectors are not fully mated; and
- the second housing comprises a protrusion configured to, when the second housing is moved along the mating direction to mate fully with the first housing, deflect a latch arm of the second latch in a direction perpendicular to the mating direction and parallel to a plane of the upper surface of the first housing, the deflection of the latch arm enabling the CPA to be moved from the disengaged configuration to the engaged configuration.

6. The first electrical connector of claim 1, further comprising:
- a terminal for use in the first electrical connector, the terminal comprising:
  - a mating end configured to receive a contact pin of the second electrical connector;
  - a crimping end configured to be crimped onto an electrical wire; and
  - an intermediate portion between the mating end and the crimping end, wherein:
    - the terminal is elongated along a mating direction; and
    - the intermediate portion comprises a blocking feature extending inwards toward a center line of the terminal along a direction that is perpendicular to the mating direction.

7. The first electrical connector of claim 6, wherein:
- the blocking feature is configured to contact a protrusion of the first electrical connector when the terminal is inserted into the first electrical connector and prevent withdrawal of the terminal from the first electrical connector.

8. The first electrical connector of claim 6, wherein:
- the intermediate portion comprises a base and a wall extending from the base; and
- the intermediate portion comprises a locking feature that extends from a distal portion of the wall.

9. The first electrical connector of claim 8, wherein:
- the wall comprises a first wall;
- the intermediate portion further comprises a second wall extending from the base;
- the first and second walls are disposed on opposite sides of the center line of the terminal along the mating direction; and
- the first wall extends from the base farther than the second wall.

10. The first electrical connector of claim 1, wherein:
- the first housing comprises a protrusion configured to block the second latch of the CPA feature, thereby impeding the CPA feature from moving into the engaged configuration when the first and second electrical connectors are not fully mated.

11. The first electrical connector of claim 10, in combination with the second electrical connector, wherein:
- the second housing is configured to, as the first and second electrical connectors become fully mated, cause the second latch to deflect away from the protrusion of the first housing that is blocking the second latch, thereby allowing the CPA feature to move into the engaged configuration.

12. The first electrical connector of claim 1, wherein:
- the first housing comprises a cavity configured to receive a receptable connector, the cavity being disposed between a first side wall and a second side wall of the first housing;
- a vertical groove formed in the first side wall of the first housing; and
- a hold-down feature configured to slide into the vertical groove to secure the first housing to a substrate.

13. The first electrical connector of claim 12, wherein:
- the hold-down feature comprises one or more beams configured to prevent the first housing from moving in a direction perpendicular to a plane of the substrate by exerting a spring force against the first housing.

14. The first electrical connector of claim 13, wherein the hold-down feature comprises two beams.

15. The first electrical connector of claim 13, wherein:

the first side wall of the first housing comprises a ledge, and the one or more beams are configured to engage the ledge when the hold-down feature is slid into the vertical groove.

16. A first electrical connector, comprising:

a first housing;

a first terminal inserted into a first cavity of the first housing, the first terminal comprising a locking feature:

a connector position assurance (CPA) feature attached to the first housing, the CPA feature being movable between a disengaged configuration and an engaged configuration; and a terminal position assurance (TPA) feature movably coupled to the first housing, the TPA feature being movable between a disengaged configuration and an engaged configuration, wherein:

the CPA feature comprises a first latch configured to attach the CPA feature to the first housing when the CPA feature is in the disengaged configuration;

the first electrical connector is configured to mate with a second electrical connector having a second housing;

the CPA feature comprises a second latch configured to attach the CPA feature to the second housing when the CPA feature is in the engaged configuration; and the first housing is configured to impede the CPA feature from moving into the engaged configuration when the first and second electrical connectors are not fully mated the TPA feature comprises a recess;

when the TPA feature is in the engaged configuration, the locking feature of the first terminal engages the TPA feature to retain the first terminal in the first cavity; and the recess is configured to receive the locking feature of the first terminal when the TPA feature is in the engaged configuration.

17. The first electrical connector of claim 16, further comprising:

a first plurality of like terminals arranged in a first row; and a second plurality of like terminals arranged in a second row, wherein:

the first terminal is disposed in the first row;

a second terminal is disposed in the second row;

the first row is vertically offset from the second row;

for each terminal in the first row, when the TPA feature is in the engaged configuration, the locking feature of the terminal engages the TPA feature to retain the terminal in a respective cavity in the housing; and for each terminal in the second row, the locking feature of the terminal engages the housing to retain the terminal in a respective cavity in the housing.

18. A first electrical connector in combination with a second electrical connector, the first electrical connector comprising:

a first housing; and a connector position assurance (CPA) feature attached to the first housing, the CPA feature being movable between a disengaged configuration and an engaged configuration, wherein:

the CPA feature comprises a first latch configured to attach the CPA feature to the first housing when the CPA feature is in the disengaged configuration;

the first electrical connector is configured to mate with the second electrical connector having a second housing;

the CPA feature comprises a second latch configured to attach the CPA feature to the second housing when the CPA feature is in the engaged configuration; and the first housing is configured to impede the CPA feature from moving into the engaged configuration when the first and second electrical connectors are not fully mated, wherein:

the second electrical connector comprises a hold-down feature coupled to the second housing, the hold-down feature configured to secure the second housing to a substrate.

19. The first electrical connector of claim 18, in combination with the second electrical connector, wherein:

the second housing comprises a vertical groove, and the hold-down feature is configured to slide into the vertical groove.

20. The first electrical connector of claim 19, in combination with the second electrical connector, wherein:

the hold-down feature comprises one or more beams configured to prevent the second housing from moving in a direction perpendicular to a plane of the substrate by exerting a spring force against the second housing.

21. The first electrical connector of claim 20, in combination with the second electrical connector, wherein:

the second housing comprises a ledge, and the one or more beams are configured to engage the ledge when the hold-down feature is slid into the vertical groove.

* * * * *